US007287160B2

(12) United States Patent
Kanai

(10) Patent No.: US 7,287,160 B2
(45) Date of Patent: Oct. 23, 2007

(54) RECORDING MEDIUM, REPRODUCING DEVICE, AND RECORDING/REPRODUCING DEVICE

(75) Inventor: Yuichi Kanai, Bisai (JP)

(73) Assignee: Sanyo Electric Co., Ltd., Osaka (JP)

( * ) Notice: Subject to any disclaimer, the term of this patent is extended or adjusted under 35 U.S.C. 154(b) by 796 days.

(21) Appl. No.: 10/489,335

(22) PCT Filed: Sep. 10, 2002

(86) PCT No.: PCT/JP02/09240

§ 371 (c)(1),
(2), (4) Date: Mar. 12, 2004

(87) PCT Pub. No.: WO03/030533

PCT Pub. Date: Apr. 10, 2003

(65) Prior Publication Data

US 2004/0250101 A1    Dec. 9, 2004

(30) Foreign Application Priority Data

Sep. 14, 2001   (JP)   ............................. 2001-279530

(51) Int. Cl.
*G06F 1/24* (2006.01)
(52) U.S. Cl. .................. 713/162; 713/168; 713/193
(58) Field of Classification Search ................ 713/167, 713/168, 193
See application file for complete search history.

(56) References Cited

U.S. PATENT DOCUMENTS

2001/0010664 A1   8/2001   Ando et al.
2001/0010671 A1   8/2001   Ando et al.
2002/0024892 A1   2/2002   Ando et al.

FOREIGN PATENT DOCUMENTS

| EP | 0 838 820 A2 | 4/1998 |
|---|---|---|
| EP | 1 128 674 A1 | 8/2001 |
| JP | 08-322034 | 12/1996 |
| JP | 10-136312 | 5/1998 |
| JP | 2001-268480 A | 9/2001 |
| WO | WO 00/28737 | 5/2000 |
| WO | WO 00/49803 | 8/2000 |

OTHER PUBLICATIONS

Japanese Office Action with English translation issued in corresponding Japanese Patent Application No. JP 2003-533595, mailed Apr. 3, 2007.

*Primary Examiner*—Thomas R. Peeso
(74) *Attorney, Agent, or Firm*—McDermott Will & Emery LLP

(57) ABSTRACT

A storage device formed of a hard disk stores a search table including an index object, a start time stamp, an end time stamp, a decryption start point correlated with index object, and a GOP location offset correlated with index object. Decryption start point indicates a decryption start point for a block including audio and video data broadcast in synchronization with an object and GOP location offset indicates an amount offset between a decryption start point and GOP's random access point.

14 Claims, 15 Drawing Sheets

RECORDING MEDIUM, REPRODUCING DEVICE, AND RECORDING/REPRODUCING DEVICE

TECHNICAL FIELD

The present invention relates to recording media encrypting and recording digitally broadcast audio and video data, reproduction apparatuses reproducing the audio and video data from the recording media, and recording and reproduction apparatuses receiving and recording the audio and video data or encrypted audio and video data on recording media and reproducing the data.

BACKGROUND ART

Audio and video data configuring broadcast programs are encoded in accordance with the moving picture expert group (MPEG) 2 standard into units as prescribed and are digitally broadcast. Recently, an object of a data broadcast associated with a broadcast program is broadcast together with audio and video data configuring the program.

A receiver receives the encoded audio and video data and the data broadcast's object and stores the data and the object to a storage device, and also reads the data and the object from the storage device for reproduction.

FIG. 16 shows a stream of audio and video data encoded by MPEG2, as represented on a time base for display, a stream of the data in file space, and a search table. The audio and video data encoded by MPEG2 has a structure grouped by a unit referred to as "group of pictures (GOP)." A plurality of GOPs are each formed of a B picture, an I picture and a P picture. On the timebase for display a stream 300 has each GOP starting with a B picture, whereas in the file space a stream 400 has each GOP starting with an I picture. This is because decoding video data encoded by MPEG2 can only start at an I picture employing only intra-image compression. At the top of each GOP a sequence header exists, and the top of the header will be a point of random access.

When audio and video data is stored to a storage device, an object of a data broadcast associated with a broadcast program formed of the audio and video data to be stored is also received. Accordingly, to search each program in accordance with an object, a search table 500 is created that is formed of an object of a data broadcast, start and end time stamps indicating a timing, on a timebase for display, of displaying to an external output device the audio and video data of a period of time for which an object of each data broadcast is transmitted, and a random access point corresponding to each start time stamp, as seen in file space (file location of the top of a GOP), and the table is stored to the storage device together with the audio and video data. Thus, search table 500 is formed of an index object, a start time stamp, an end time stamp, and a file location of the top of a GOP.

If a GOP is formed of audio and video data of 0.5 second for 15 frames, then a random access point T in seconds on the timebase for display will be a random access point n in the file space, and a random access point T+0.5 in seconds on the timebase will be a random access point n+1 in the file space, and a random access point T+1.0 in seconds on the timebase will be a random access point n+2 in the file space.

If a data broadcast's object (m) is broadcast from start time stamp T through end time stamp T+5.0 in seconds and an object (m+1) is broadcast from start time stamp T+1.0 through end time stamp T+11.0 in seconds, then object (m) synchronizes with audio and video data starting at random access point n and object (m+1) synchronizes with audio and video data starting at random access point n+2.

As such, if table 500 correlating each object (m), (m+1), . . . broadcast by a data broadcasting service, start and end time stamps indicating a period for which each object (m), (m+1), . . . is broadcast, and a file location of the top of a GOP with each other, is stored to a storage device together with stream 400 provided in file space, each object (m), (m+1), . . . can be used to allow a user to reproduce audio and video data at a location as desired for reproduction.

More specifically, when a user designates object (m), a file location n of the top of a GOP corresponding to object (m) is read from search table 500 and reproduction starts at audio and video data present at the read file location n. This also applies when other objects (m+1), . . . are designated.

With reference to FIG. 17, audio and video data stored in a storage device is searched for and reproduced in accordance with an object transmitted by a data broadcasting service, as will now be described. When reproduction starts, a user designates a broadcast program that the user desires to reproduce, from the designated program's search table any object is selected and an instruction is issued to reproduce the same (step (S)101). More specifically, when the user designates a broadcast program that the user desires to reproduce, the designated program's search table is read from a storage device and displayed on a CRT. The user refers to the displayed table, selects an object that the user desires to reproduce, and instructs reproduction of the selected object.

Once an object has been selected, the selected object's start and end time stamps and a file entry location, or a file location of the top of a GOP, are ensured from the search table (S102). Then, a stream file's entry location corresponding to the ensured file location is searched for (S103). An entry location is detected, and transferring audio and video data starts at the detected location (S104).

The start time stamp read from the search table is compared with an AV stream's time stamp and if the they match, displaying audio and video data starts (S105). Then when AV stream's time stamp matches the end time stamp read from the search table (S105), reproduction operation ends.

Thus a user can search for a scene that the user desires to reproduce, as based on an object of a data broadcast associated with a broadcast program, and can reproduce the retrieved scene. In this case, an object refers for example to a still picture or a caption.

Recently, however, issues associated with protection of copyright of digital content are increasingly discussed and rather than exactly storing to a storage device audio and video data broadcast as digital data, encrypting the data in a prescribed system and storing it to a storage device is considered. When audio and video data is encrypted, the data is divided by a prescribed bit count and encrypted.

As such, the audio and video data is divided by the prescribed bit count independently of the GOP unit, and the location of the top of a GOP does not necessarily match that of the top of the encrypted audio and video data. In contrast, when an object transmitted by a data broadcasting service associated with a broadcast program is designated and audio and video data that a user desires to reproduce is randomly reproduced, the object's start location in the aforementioned system matches the top of the coding unit (the GOP unit), and reproduction of encrypted audio and video data cannot be started at a location indicated by the user for reproduction, i.e., the object's start location.

DISCLOSURE OF THE INVENTION

The present invention has been made to solve such disadvantage. It contemplates a recording medium recording audio and video data to allow reproduction of the audio and video data to be started at a location designated by an object sent by a data broadcasting service, even when the audio and video data is encrypted.

The present invention also contemplates a reproduction apparatus capable of starting reproducing audio and video data at a location designated by an object sent by a data broadcasting service, even when the audio and video data is encrypted.

The present invention also contemplates a recording and reproduction apparatus capable of recording encrypted audio and video data on a recording medium and starting reproducing encrypted audio and video data at a location designated by an object sent by a data broadcasting service.

The present invention provides a recoding medium that is a randomly accessible recording medium recording audio and video data configuring a broadcast program and encoded into units as prescribed. The recording medium includes: encrypted data formed of a plurality of blocks of the audio and video data encoded encrypted; a plurality of objects associated with the program and broadcast as a data broadcasting service; a plurality of decryption start location information provided to correspond to the plurality of objects and indicating a decryption start location starting decrypting encrypted data included in a block formed by encrypting audio and video data broadcast in synchronization with each object; and a plurality of offset information provided to correspond to the plurality of decryption start location information and indicating an amount offset between the decryption start location for encrypted data included in a single block and a random access location of the unit including audio and video data identical to a portion of audio and video data obtained by decrypting encrypted data included in the single block. The random access location is located between the decryption start location for the single block and a decryption end location ending decrypting the encrypted data.

Preferably the recording medium further includes a decryption key used to decrypt the encrypted data.

Preferably the recording medium further includes a plurality of time stamps provided to correspond to the plurality of objects and indicating a timing of outputting to an external output device audio and video data located at a top of a unit synchronized with each object's start timing.

Furthermore the present invention provides a recording and reproduction apparatus receiving and recording to and reproducing from a recording medium audio and video data configuring a broadcast program and encoded into units as prescribed and an object broadcast as a data broadcasting service associated with the program. The apparatus includes: means receiving the audio and video data and the object; encryption means encrypting the received audio and video data in a prescribed system to generate encrypted data formed of a plurality of blocks; recording means recording to the recording medium the encrypted data, a search table used to search as based on the object for audio and video data broadcast in synchronization with the object, and a decryption key used to decrypt the encrypted data; and means receiving an instruction issued to reproduce the audio and video data to decrypt the encrypted data with the decryption key in accordance with the search table, separate resultant, decrypted audio and video data for each unit into audio data and video data for reproduction. The search table is formed of a plurality of the objects, a plurality of decryption start location information provided to correspond to the plurality of objects, and a plurality of offset information provided to correspond to the plurality of decryption start location information. The decryption start location information indicates a decryption start location starting decrypting encrypted data included in a single block formed by encrypting audio and video data broadcast in synchronization with each object. The offset information indicates an amount offset between a decryption start location for encrypted data included in the single block and a random access location of the unit including audio and video data identical to a portion of audio and video data decrypted from encrypted data included in the single block. The random access location is located between the decryption start location for the single block and a decryption end location ending decrypting the encrypted data. The reproduction means deletes from the decrypted audio and video data audio and video data corresponding to an amount offset designated by the offset information, for reproduction for each unit.

Preferably the recording and reproduction apparatus further includes key generation means generating an encryption key used to encrypt the audio and video data and a decryption key used to decrypt data encrypted with the encryption key.

Preferably the recording and reproduction apparatus further includes means creating the search table from the received audio and video data and object and the encrypted data.

The present invention provides a recording and reproduction apparatus receiving and recording to and reproducing from a recording medium encrypted data formed of a plurality of blocks corresponding to an encryption in a prescribed system of audio and video data configuring a broadcast program and encoded into units as prescribed and an object associated with the program and broadcast as a data broadcasting service. The apparatus includes: means receiving the encrypted data, a decryption key used to decrypt the encrypted data, and the object; recording means recording to the recording medium the encrypted data, a search table used to search as based on the object for audio and video data broadcast in synchronization with the object, and the decryption key; and means receiving an instruction issued to reproduce the audio and video data to decrypt the encrypted data with the decryption key in accordance with the search table, separate resultant, decrypted audio and video data for each unit into audio data and video data for reproduction. The search table is formed of a plurality of the objects, a plurality of decryption start location information provided to correspond to the plurality of objects, and a plurality of offset information provided to correspond to the plurality of decryption start location information. The decryption start location information indicates a decryption start location starting decrypting encrypted data included in a single block formed by encrypting audio and video data broadcast in synchronization with each object. The offset information indicates an amount offset between a decryption start location for encrypted data included in the single block and a random access location of the unit including audio and video data identical to a portion of audio and video data decrypted from encrypted data included in the single block. The random access location is located between the decryption start location for the single block and a decryption end location ending decrypting the encrypted data. The reproduction means deletes from the decrypted audio and video data audio and video data corresponding to an amount offset designated by the offset information, for reproduction for each unit.

Preferably the recording and reproduction apparatus further includes means decrypting the encrypted data with the decryption key and using resultant, decrypted audio and video data and the object to create the search table.

The present invention provides a recording and reproduction apparatus receiving and recording to and reproducing from a recording medium encrypted data formed of a plurality of blocks corresponding to an encryption in a prescribed system of audio and video data configuring a broadcast program and encoded into units as prescribed and an object associated with the program and broadcast as a data broadcasting service. The apparatus includes: means receiving the encrypted data, a decryption key used to decrypt the encrypted data, the object, and a search table used to search as based on the object for audio and video data broadcast in synchronization with the object; means recording the encrypted data, the search table and the decryption key to the recording medium; and means receiving an instruction issued to reproduce the audio and video data to decrypt the encrypted data with the decryption key in accordance with the search table, separate resultant, decrypted audio and video data for each unit into audio data and video data for reproduction. The search table is formed of a plurality of the objects, a plurality of decryption start location information provided to correspond to the plurality of objects, and a plurality of offset information provided to correspond to the plurality of decryption start location information. The decryption start location information indicates a decryption start location starting decrypting encrypted data included in a single block formed by encrypting audio and video data broadcast in synchronization with each object. The offset information indicates an amount offset between a decryption start location for encrypted data included in the single block and a random access location of the unit including audio and video data identical to a portion of audio and video data decrypted from encrypted data included in the single block. The random access location is located between the decryption start location for the single block and a decryption end location ending decrypting the encrypted data. The reproduction means deletes from the decrypted audio and video data audio and video data corresponding to an amount offset designated by the offset information, for reproduction for each unit.

Preferably the reproduction means includes: a decryption circuit decrypting the encrypted data with the decryption key; a filter deleting from audio and video data decrypted by the decryption circuit audio and video data corresponding to an amount offset designated by the offset information; a demultiplexer receiving audio and video data from the filter to separate the audio and video data into the video data and the audio data; a video processing circuit processing the video data for external output; and an audio processing circuit processing the audio data for external output.

The present invention provides a reproduction apparatus decrypting and reproducing encrypted data recorded on a recording medium, the encrypted data being formed of a plurality of blocks corresponding to an encryption in a prescribed system of audio and video data configuring a broadcast program and encoded into units as prescribed, the recording medium including the encrypted data, a decryption key used to decrypt the encrypted data and a search table used to search as based on an object associated with the program and transmitted as a data broadcasting service for audio and video data broadcast in synchronization with the object, the search table being formed of a plurality of the objects, a plurality of decryption start location information provided to correspond to the plurality of objects and a plurality of offset information provided to correspond to the plurality of decryption start location information, the decryption start location information being indicative of a decryption start location starting decrypting encrypted data included in a single block formed by encrypting audio and video data broadcast in synchronization with each object, the offset information being indicative of an amount offset between a decryption start location for encrypted data included in the single block and a random access location of the unit including audio and video data identical to a portion of audio and video data decrypted from encrypted data included in the single block, the random access location being located between the decryption start location for the single block and a decryption end location ending decrypting the encrypted data. The reproduction apparatus includes: a decryption circuit decrypting the encrypted data with the decryption key; a filter deleting from audio and video data decrypted by the decryption circuit audio and video data corresponding to an amount offset designated by the offset information; a demultiplexer receiving audio and video data from the filter to separate the audio and video data into the video data and the audio data; a video processing circuit processing the video data for external output; and an audio processing circuit processing the audio data for external output.

BEST MODES FOR CARRYING OUT THE INVENTION

Embodiments of the present invention will now be described with reference to the drawings in detail. Throughout the figures, like components are identically denoted.

First Embodiment

Figure 1:
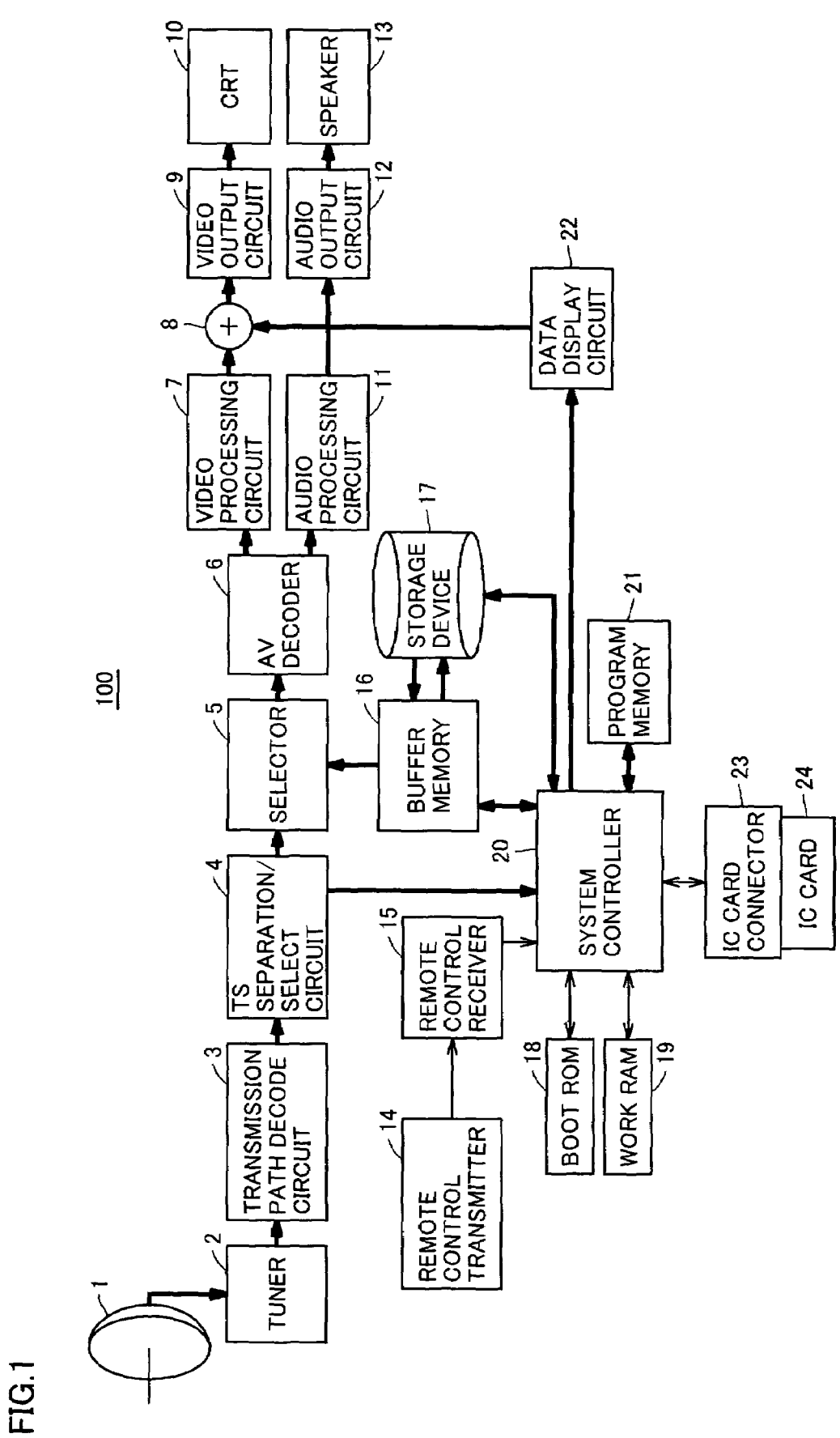
FIG. 1 is a schematic block diagram of a receiver in a first embodiment.

Reference will initially be made to FIG. 1 to describe a receiver having a storage function and used for digital satellite broadcasting. A receiver 100 includes an antenna 1, a tuner 2, a transmission path decode circuit 3, a TS separation/select circuit 4, a selector 5, an AV decoder 6, a video processing circuit 7, a mixer 8, a video output circuit 9, a CRT 10, an audio processing circuit 11, an audio output circuit 12, a speaker 13, a remote control transmitter 14, a remote control receiver 15, a buffer memory 16, a storage device 17, a boot read only memory (booth ROM) 18, a work random access memory (work RAM) 19, a system controller 20, a program memory 21, a data display circuit 22, and an IC card connector 23.

Antenna 1 receives a digitally modulated signal. Tuner 2 selects a user selected channel in accordance with an instruction issued by system controller 20 and from a signal received at antenna 1 extracts a signal of the selected channel. Transmission path decode circuit 3 decodes the signal extracted at tuner 2 into audio and video data encoded by MPEG2 and an object broadcast as a data broadcasting service and outputs the same to TS separation/select circuit 4.

When the audio and video data and the data broadcast's object are not stored, TS separation/select circuit 4 outputs the audio and video data to selector 5 and the object to system controller 20. When the audio and video data and the object are to be stored, TS separation/select circuit 4 outputs the data and the object to system controller 20.

Selector 5 outputs to AV decoder 6 the audio and video data received from TS separation/select circuit 4 or audio and video data encrypted received from buffer memory 16. When AV decoder 6 receives unencrypted audio and video data from selector 5, AV decoder 6 separates the received audio and video data for each coding unit into video data and audio data and outputs the separated video data to video processing circuit 7 and the separated audio data to audio processing circuit 11. Furthermore when AV decoder 6 receives encrypted audio and video data from selector 5, AV decoder 6 decodes the encrypted audio and video data, separates the decoded audio and video data for each coding unit into video data and audio data, and outputs the video data to video processing circuit 7 and the audio data to audio processing circuit 11.

Video processing circuit 7 reproduces video data and outputs it to mixer 8. Mixer 8 composites together the video data reproduced by video processing circuit 7 and an object of a data broadcast received from data display circuit 22 and outputs the same to video output circuit 9. Video output circuit 9 displays via CRT 10 a screen corresponding to the composite of the video data and the object received from mixer 8. CRT 10 provides the screen received from video output circuit 9 to a user as visual information.

Audio processing circuit 11 receives audio data from AV decoder 6 and reproduces and outputs the audio data to audio output circuit 12. Audio output circuit 12 outputs to speaker 13 the audio data reproduced by audio processing circuit 11. Speaker 13 externally outputs the audio data.

Remote control transmitter 14 receives and transmits a user instruction to remote control receiver 15. Remote control receiver 15 receives the instruction from remote control transmitter 14 and outputs it to system controller 20. Buffer memory 16 receives encrypted audio and video data from system controller 20 and writes the data to storage device 17. Furthermore buffer memory 16 provides to selector 5 audio and video data encrypted read from storage device 17.

Storage device 17 is formed of a hard disk (HDD) capable of recording data densely and randomly accessible. Storage device 17 stores audio and video data encrypted or encrypted data, a decryption key used to decrypt encrypted data, an object of a data broadcast, and a search table used to decrypt data of an encryption of audio and video data broadcast in synchronization with an object of a data broadcast and reproduce the same for each coding unit.

Boot ROM 18 is formed of flash memory and stores data used to initialize each component of receiver 100. Note that in FIG. 1, boot ROM 18 is capable of bidirectional communication with system controller 20 since the data used for initializing each component of receiver 100 is rewritable by data received by antenna 1, transmitted through tuner 2, transmission path decode circuit 3 and TS separation/select circuit 4 and input to system controller 20.

Work RAM 19 is a work memory used when system controller 20 initializes each component of receiver 100. When audio and video data is to be stored to storage device 17, system controller 20 generates an encryption key used to encrypt audio and video data and a decryption key used to decrypt audio and video data having been encrypted with the encryption key. System controller 20 uses the generated encryption key to encrypt audio and video data received from TS separation/select circuit 4. System controller 20 thus generates and outputs encrypted data to buffer memory 16 and also stores the generated decryption key to storage device 17.

Furthermore, system controller 20 uses audio and video data received from TS separation/select circuit 4, audio and video data encrypted or encrypted data, and an object of a data broadcast to create a search table on program memory 21, as will be described hereinafter, and stores the table to storage device 17.

When an object of a data broadcast is to be stored, system controller 20 stores to storage device 17 an object of a data broadcast received from TS separation/select circuit 4. In that case, system controller 20 may once store to program memory 21 an object of a data broadcast received from TS separation/select circuit 4 and convert the object's format for storage before storing to storage device 17.

When encrypted data stored in storage device 17 is to be reproduced, system controller 20 confirms whether a decryption key employed to decrypt encrypted data is set in AV decoder 6. If not, a decryption key is read from storage device 17 and set in AV decoder 6. Then if there is not a search table stored in program memory 21, system controller 20 reads a search table from storage device 17 and stores it to program memory 21. Once system controller 20 has stored the table to program memory 21, system controller 20 refers to the table to control storage device 17 to output encrypted data correlated with an object of a data broadcast designated by a user.

Furthermore, system controller 20 receives an object of a data broadcast from TS separation/select circuit 4 and processes and outputs it to data display circuit 22.

Furthermore, system controller 20 determines from an identification number received from IC card connector 23 whether receiver 100 is used by an authorized user.

Program memory 21 stores an object of a data broadcast and a search table and also functions as a work memory used when system controller 20 creates a search table.

Data display circuit 22 indicates to mixer 8 a designated location on CRT 10 of an object of a data broadcast to be displayed received from system controller 20, and outputs the object's data to mixer 8.

IC card connector 23 reads a user's identification number recorded in an IC card 24 and outputs the read identification number to system controller 20. Furthermore, IC card connector 23 receives from system controller 7 an account charged on a user for using receiver 100 and writes the received account to IC card 24.

IC card 24 stores an identification number of a user of receiver 100, content of a contract applied in using receiver 100, an account charged for using receiver 100, and the like.

Figure 2:
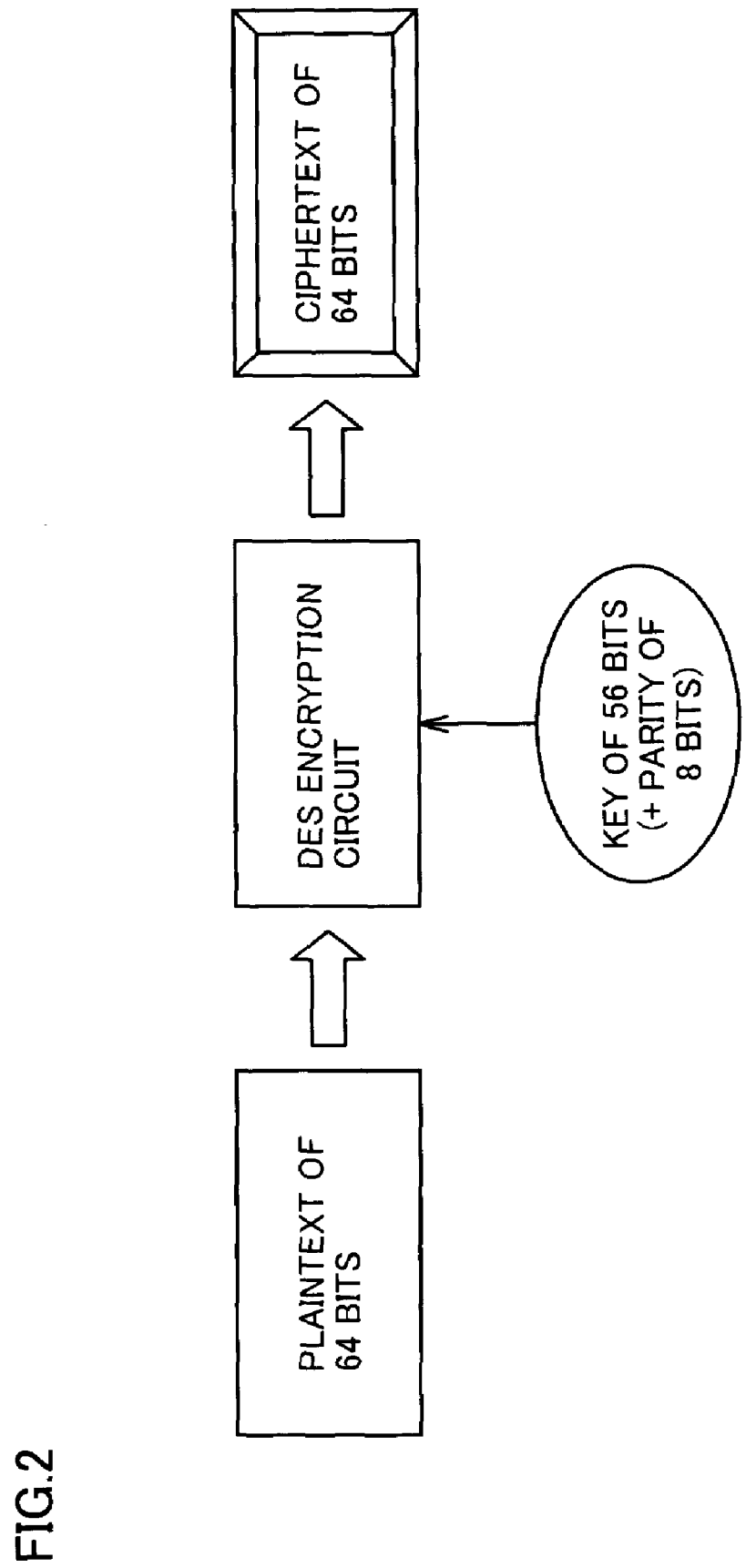
FIG. 2 shows a concept of encrypting audio and video data.
Figure 3:
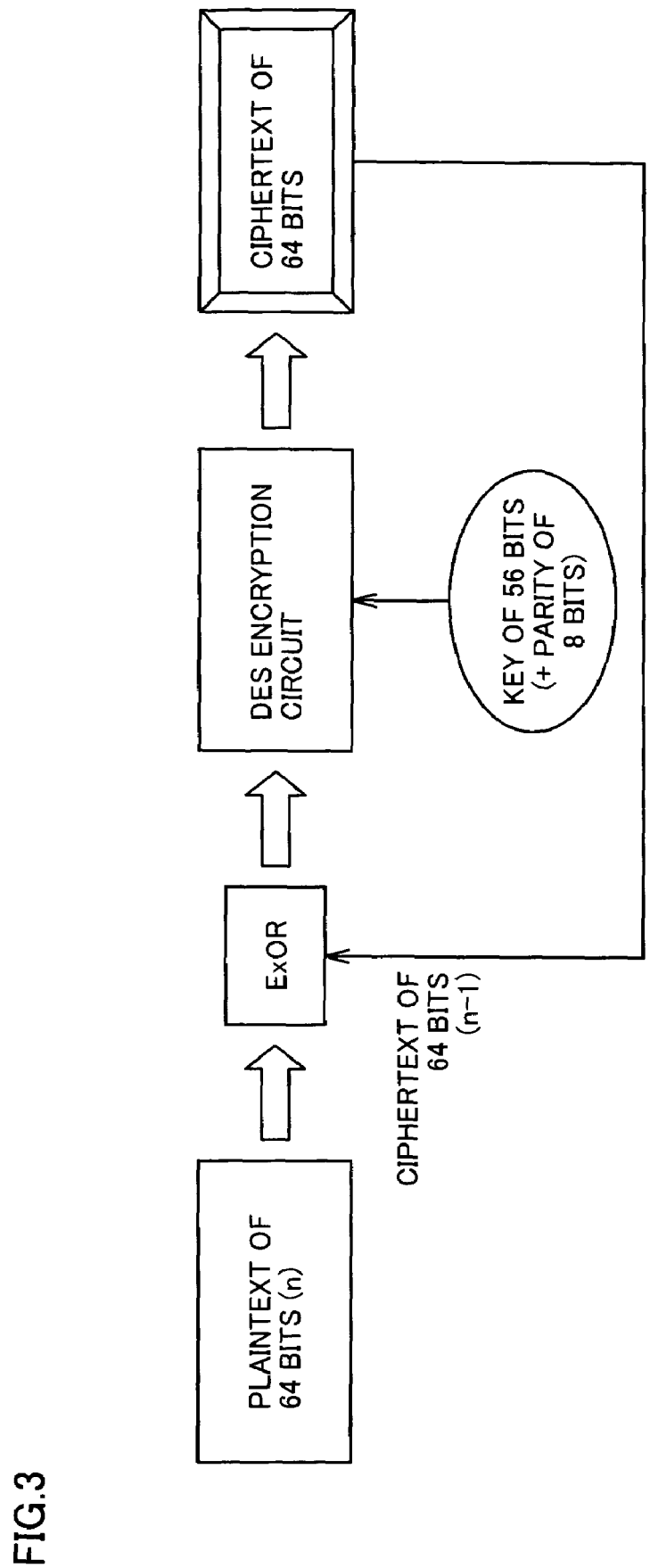
FIG. 3 shows an another concept of encrypting audio and video data.

As has been described above, when audio and video data is to be stored to storage device 17, receiver 100 encrypts and stores the audio and video data. Reference will now be made to FIGS. 2 and 3 to describe a concept of encrypting audio and video data. In the present invention, for example, audio and video data is encrypted by data encryption standard (DES).

With reference to FIG. 2, audio and video data is divided into plaintext blocks of 64 bits and encrypted by a DES encryption circuit using a 64-bit encryption-key (of which, 8 bits are parity bit) to generate 64-bit ciphertext.

This DES encryption system is a private-key system, and an encryption key used to encrypt audio and video data and a decryption key used to decrypt encrypted data are identical. In other words, encryption and decryption keys are shared between a producer and a recipient. As such, encryption may be deciphered and in practice, as shown in FIG. 3, an encryption chain mode referred to as cipher block chaining (CBC) is combined together. More specifically, 64-bit audio and video data to be encrypted and the immediately preceding 64-bit ciphertext provided by the DES encryption circuit are XORed and then encrypted by the DES encryption circuit. Then, the encrypted 64-bit ciphertext and the subsequent 64-bit audio and video data are XORed. This is repeated to encrypt plaintext audio and video data successively. Note that the DES encryption circuit employs a well known algorithm.

Figure 4:
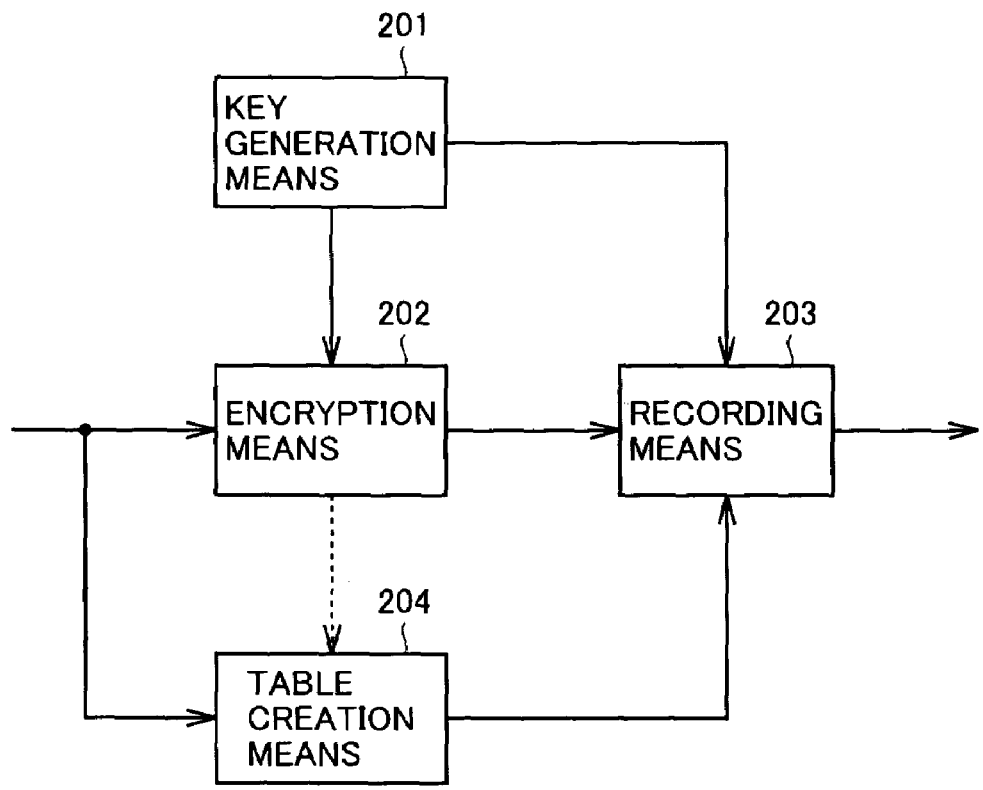
FIG. 4 is a functional block diagram of a system controller shown in FIG. 1.

Reference will now be made to FIG. 4 to describe a functional block of system controller 20 in connection with encrypting audio and video data and creating a search table. System controller 20 includes key generation means 201, encryption means 202, recording means 203, and table creation means 204. Key generation means 201 uses a random number or the like to generate an encryption/decryption key used to encrypt audio and video data and decrypt the encrypted data, and outputs the generated encryption/decryption key to encryption means 202 and recording means 203.

Encryption means 202 uses the encryption/decryption key received from key generation means 201 to encrypt in units of 64 bits audio and video data received from TS separation/selection circuit 4, and outputs the encrypted data to recording means 203. Furthermore, encryption means 202 outputs encrypted block's size information to table creation means 204.

Table creation means 204 uses audio and video data and an object of a data broadcast received from TS separation/select circuit 4 and an encrypted block's size information received from encryption means 202 to create a search table, as will be described later, and outputs the table and the object to recording means 203.

Recording means 203 receives encrypted data from encryption means 202 and stores the data via buffer memory 16 to storage device 17, and correlates with the encrypted data stored in storage device 17 a key (a decryption key) received from key generation means 201 and the search table and data broadcast's object received from table creation means 204 and stores the same to storage device 17.

Figure 5:
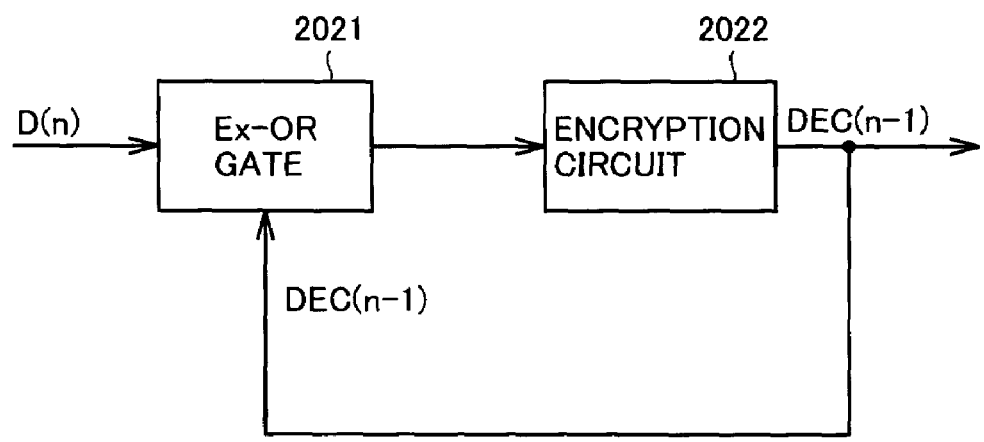
FIG. 5 is a functional block diagram of encryption means shown in FIG. 4.

With reference to FIG. 5, encryption means 202 includes an Ex-OR gate 2021 and an encryption circuit 2022. Ex-OR gate 2021 XORs plaintext audio and video data D(n) having a data length of 64 bits and the immediately preceding audio and video data D(n−1) having a data length of 64 bits that has been encrypted by encryption circuit 2022, i.e., encrypted data DEC(n−1), and outputs the resultant XOR to encryption circuit 2022.

Encryption circuit 2022 receives data from Ex-OR gate 2021, encrypts the data with a key (an encryption key) received from key generation means 201, and outputs resultant encrypted data to recording means 203 and Ex-OR gate 2021.

Figure 6:
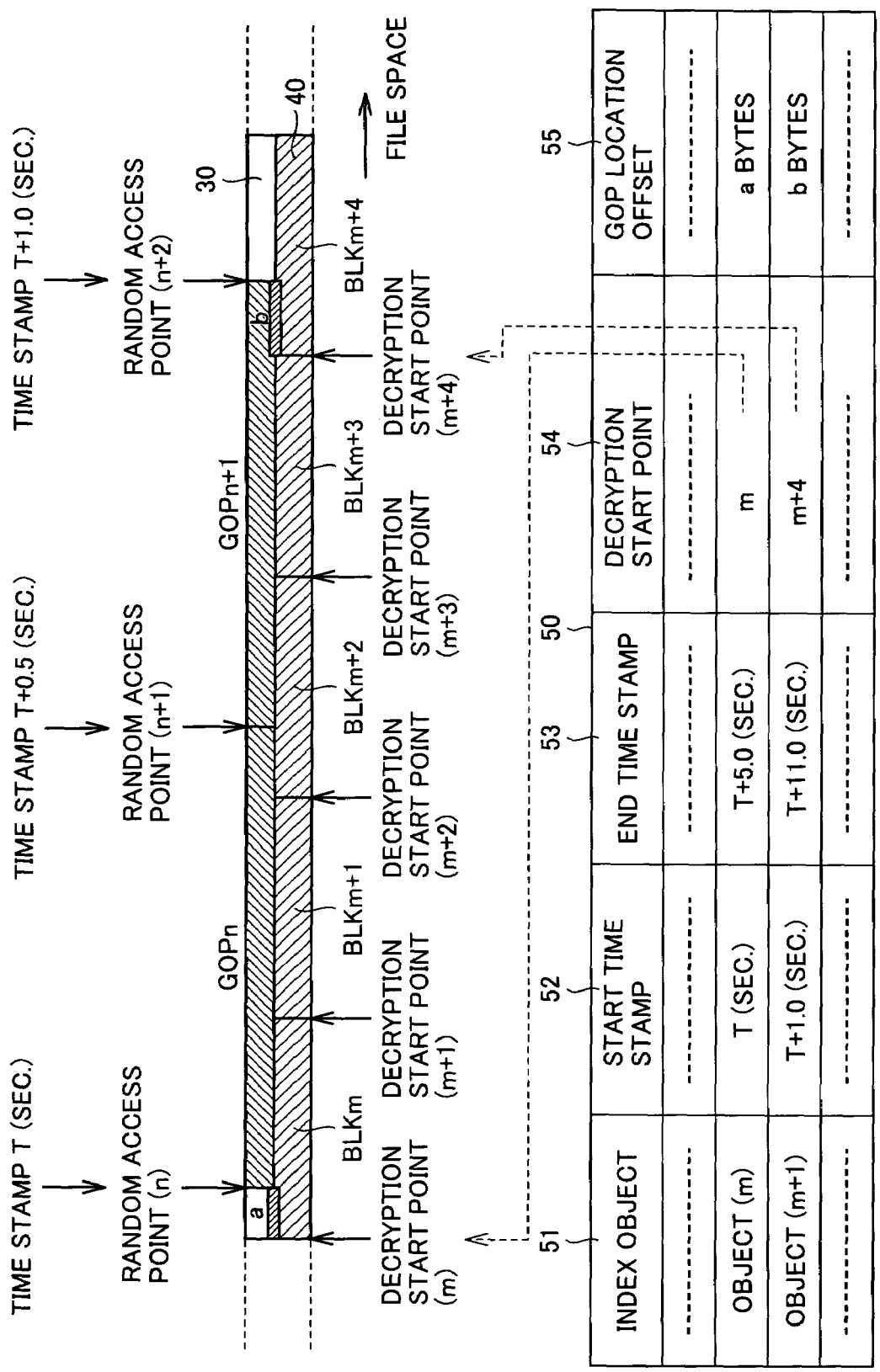
FIG. 6 illustrates a method of creating a search table.

With reference to FIG. 6, table creation means 204 creates a search table, as will be described hereinafter. Plaintext, audio and video data stream 30 is formed of GOPn, GOPn+1, and audio and video data encrypted or encrypted data 40 is formed of blocks BLKm, BLKm+1, BLKm+2, BLKm+3, BLKm+4, . . . .

GOPn has its top at a location corresponding to a random access point n, which corresponds to a time stamp T in seconds. Furthermore, GOPn+1 has its top at a location corresponding to a random access point n+1, which corresponds to a time stamp T+0.5 in seconds. GOPn+2 (not shown) has its top at a location corresponding to a random access point n+2, which corresponds to a time stamp T+1.0 in seconds.

Audio and video data encrypted contained in GOPn is contained in blocks BLKm, BLKm+1, BLKm+2. Audio and video data encrypted contained in GOPn+1 is contained in blocks BLKm+2, BLKm+3, BLKm+4.

Furthermore, a data broadcast's object (m) is broadcast for a period from start time stamp T to end time stamp T+5.0 in seconds and data broadcast's object (m+1) is broadcast for a period from start time stamp T+1.0 to end time stamp T+11.0 in seconds.

Figure 7:
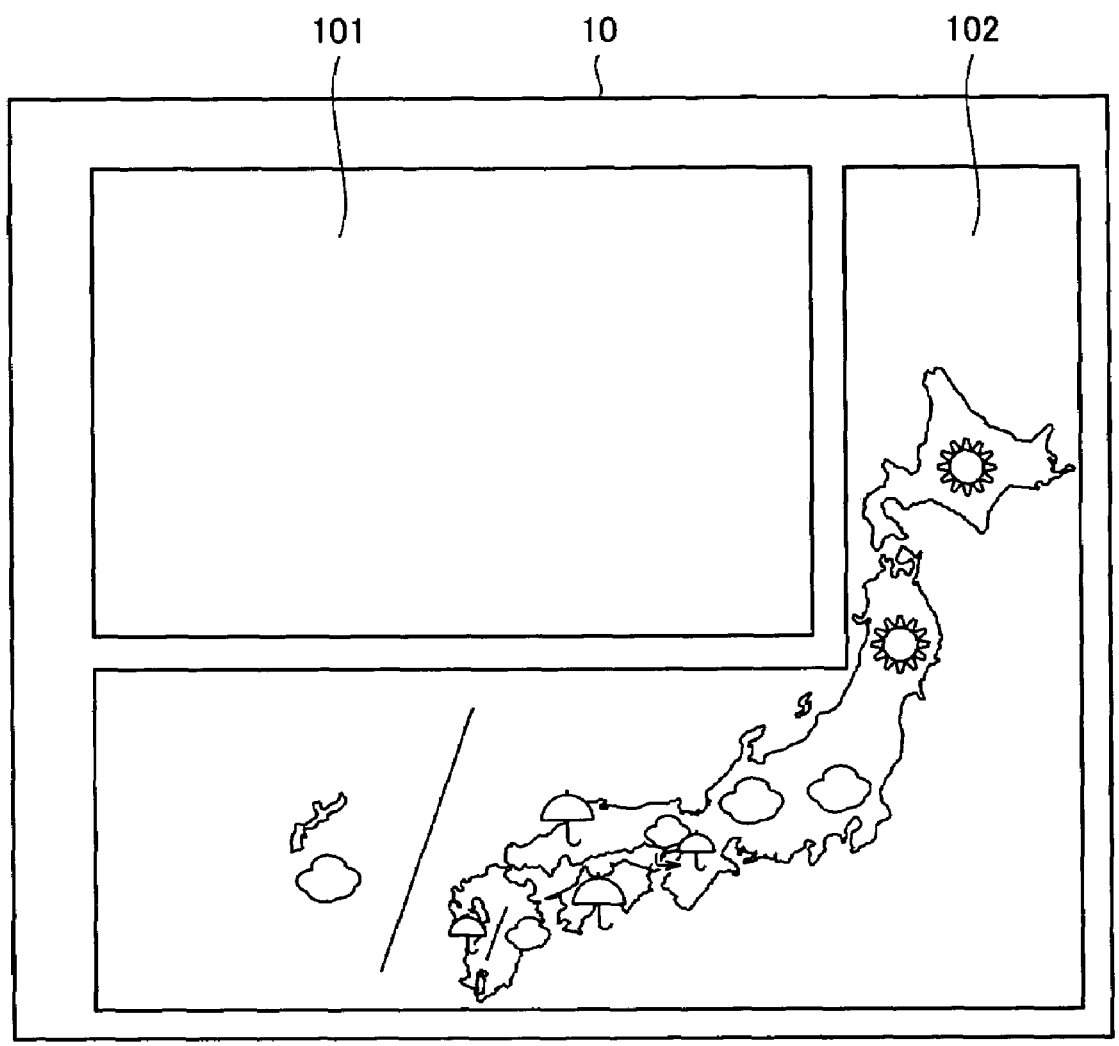
FIG. 7 represents a concept illustrating an exemplary data broadcast.
Figure 8:
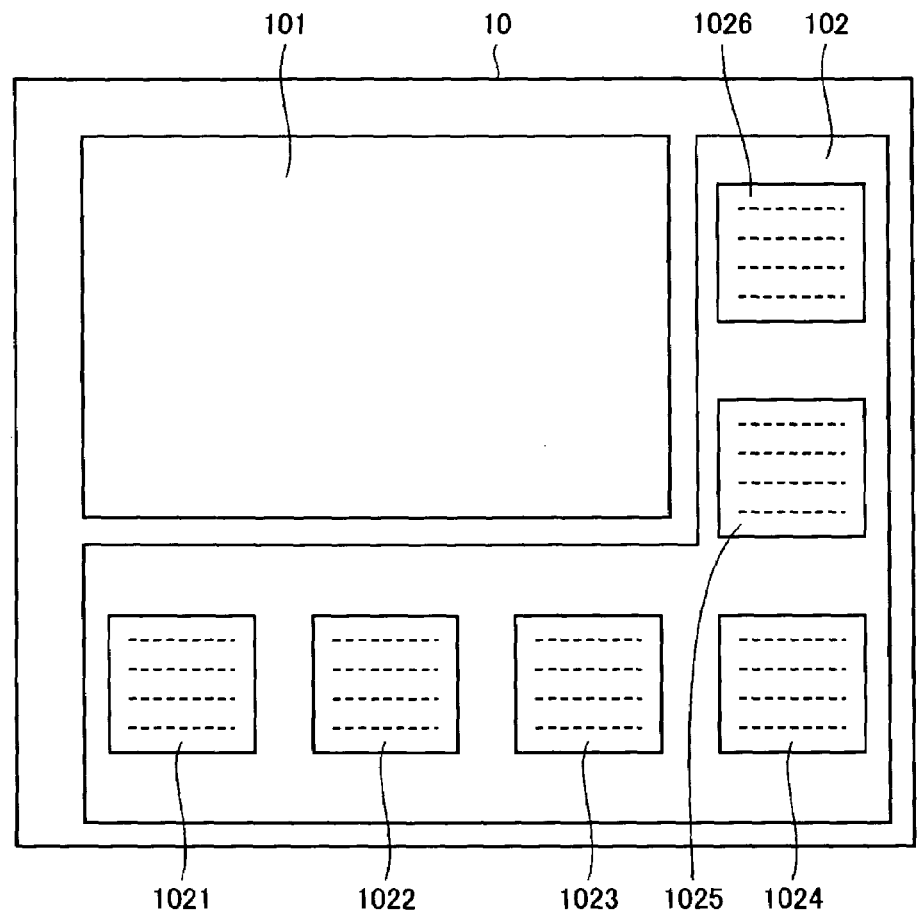
FIG. 8 represents a concept illustrating another exemplary data broadcast.

With reference to FIGS. 7 and 8, a data broadcast's objects (m), (m+1) will be described more specifically. With reference to FIG. 7, object (m) is assumed by way of example as a weather forecast broadcast in synchronization with a broadcast program. CRT 10 is formed of a region 101 displaying audio and video data configuring a broadcast program, and a region 102 displaying an object of a data broadcast. Region 101 displays audio and video data broadcast from a location corresponding to time stamp T in seconds (GOPn's top) and region 102 for example displays a weather forecast across Japan.

Furthermore, with reference to FIG. 8, object (m+1) is assumed by way of example as a recipe for each dish broadcast in synchronization with a cooking program. In that case, region 101 displays audio and video data (a screen in cooking a meal) broadcast from a location corresponding to time stamp T+1.0 in seconds (the top of GOPn+2 (not shown)) and region 102 displays as object (m+1) recipes 1021•1026 of dishes cooked in the program.

Thus an object of a data broadcast is broadcast as associated with a broadcast program and is displayed on CRT 10.

A user may desire to reproduce a broadcast program from a screen displaying recipes 1021-1026. In that case, object (m+1) serving as a recipe is designated to allow reproduction from the screen displaying recipes 1021-1026.

However, as shown in FIG. 6, start stamps T, T+1.0, . . . in seconds of objects (m), (m+1), . . . match the locations of the tops of GOPn, GOPn+2, . . . , and if a user desires to designate objects (m), (m+1) . . . to reproduce a broadcast program, encrypted data cannot be decrypted at the location of the top of each block BLKm, BLKm+4, . . . of the encrypted data to reproduce audio and video data.

Accordingly in the present invention when a user designates object (m) and instructs reproduction starting at start time stamp T in seconds, reproduction starts at encrypted data included in block BLKm and a-bit data corresponding to an amount offset between a decryption start point m and random access point n, i.e., audio and video data decrypted from encrypted data contained in block BLKm that is not contained in GOPn is deleted to reproduce audio and video data. Furthermore, when a user designate object (m+1) and instructs reproduction starting at time stamp T+1.0 in seconds, reproduction starts at encrypted data contained in block BLKm+4 and b-bit data corresponding to an amount offset between a decryption start point m+4 and random access point n+2 is deleted to reproduce audio and video data.

More specifically, decryption start point m indicating the location of the top of block BLKm and a bits corresponding to an amount offset from decryption start point m to random access point n are correlated with object (m) and time stamp T in seconds, and decryption start point m+4 indicating the location of the top of block BLKm+4 and b bits corresponding to an amount offset from decryption start point m+4 to random access point n+2 are correlated with object (m+1) and time stamp T+1.0 in seconds.

Accordingly, search table 50 is formed of an index object 51, a start time stamp 52, an end time stamp 53, a decryption start point 54, and a GOP location offset 55. Note that a GOP location offset indicates an amount offset between decryption start point m, m+4 included in a block of encrypted data and random access point m, m+2. As such, decryption start point m and a GOP location offset of a byte is correlated with time stamp T in seconds, and decryption start point m+4 and a GOP location offset of b byte are correlated with time stamp T+1.0 in seconds.

Thus table creation means 204 detects the location of the top of a GOP including audio and video data synchronized with a start time stamp of a data broadcast and a decryption start location at which starts decrypting a block including data corresponding to an encryption of audio and video data contained in the GOP, and table creation means 204 performs an operation on a decryption start location preceding the location of the top of the GOP an amount offset therefrom to the location of the top of the GOP to detect a GOP location offset. Table creation means 204 then correlates detected or operated decryption start point 54 and GOP location offset 55 with index object 51 and start time stamp 52 to create search table 50. Note that random access points n, n+1, n+2 exist at blocks BLKm, BLKm+2, BLKm+4, respectively, between their respective decryption start and end points. Furthermore, start time stamp 52 and end time stamp 53 are provided via receiver 100.

Figure 9:
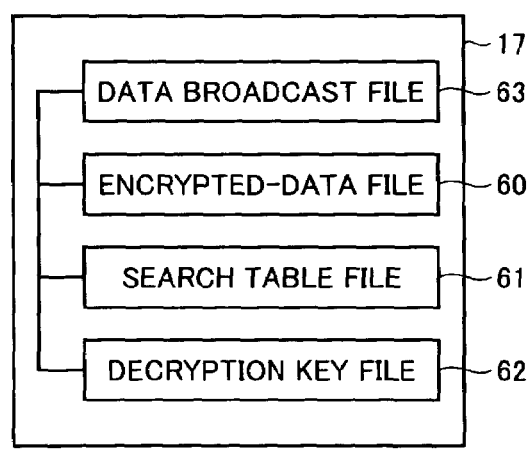
FIG. 9 represents a concept for illustrating storage of data in a storage device shown in FIG. 1.

Storage device 17 stores audio and video data encrypted or encrypted data, a search table, a decryption key used to decrypt encrypted data, and an object of a data broadcast, in the form of a file. As such, as shown in FIG. 9, storage device 17 stores an encrypted-data file 60, a search table file 61, a decryption key file 62 and a data broadcast file 63, mutually correlated.

Figure 10:
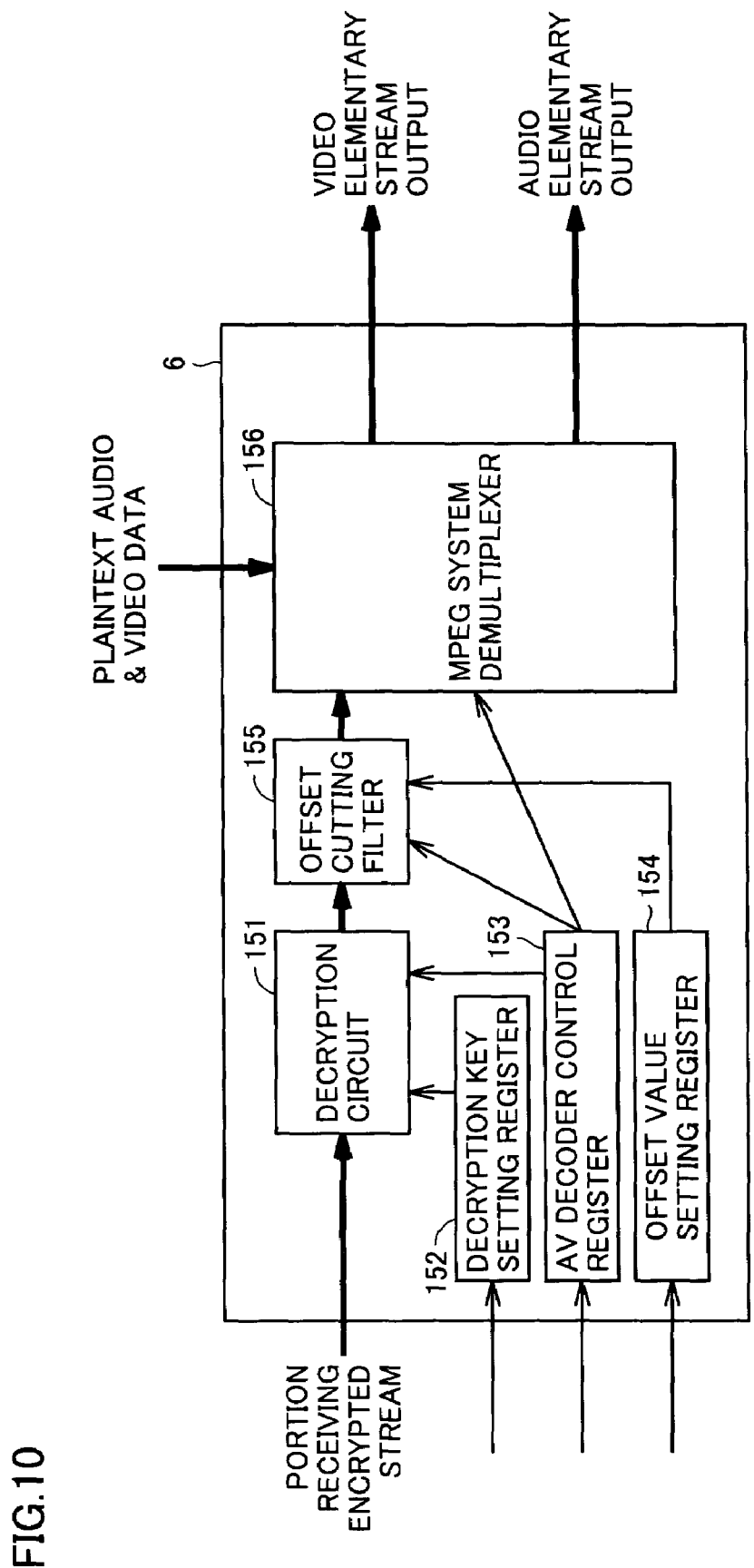
FIG. 10 is a functional block diagram of an AV decoder shown in FIG. 1.

With reference to FIG. 10, AV decoder 6 will be described more specifically. AV decoder 6 includes a decryption circuit 151, a decryption key setting register 152, an AV decoder control register 153, an offset value setting register 154, an offset cutting filter 155, and an MPEG system demultiplexer 156.

Decryption circuit 151 decrypts encrypted data with a decryption key set by register 152. Register 152 provides decryption circuit 151 with a decryption key set by system controller 20. Register 153 controls decryption circuit 151, filter 155 and MPEG system demultiplexer 156 to control for example starting and ending decrypting encrypted data.

Register 154 provides to filter 155 a GOP location offset set by system controller 20. Filter 155 deletes from audio and video data received from decryption circuit 151 the audio and video data corresponding to the GOP location offset provided by register 154 and outputs the deleted audio and video data to MPEG system demultiplexer 156.

MPEG system demultiplexer 156 receives the audio and video data from filter 155, separates the data into audio data and video data, and outputs the separated video data to video processing circuit 7 and the separated audio data to audio processing circuit 11.

Note that when AV decoder 6 receives plaintext audio and video data from selector 5, AV decoder 6 receives the audio and video data by demultiplexer 156.

Reference will again be made to FIG. 1 to describe an operation reproducing audio and video data and an object of a data broadcast without storing them to storage device 17.

When receiver 100 is powered on, system controller 20 reads data from boot ROM 18 for specialization and develops it in its work RAM 19 to initialize each component of receiver 100.

Then when receiver 100 attains a state capable of reception a user inputs to a remote control transmitter 14 a channel of a broadcast program that the user desires to watch.

Remote control transmitter 14 transmits the input channel to remote control receiver 15. Remote control receiver 15 receives the user selected channel and outputs it to system controller 20. System controller 20 controls tuner 2 to select the channel received from remote control receiver 15.

Antenna 1 receives a digitally modulated signal and outputs it to tuner 2. Tuner 2 selects a signal received from antenna 1 that is a signal of the channel selected as controlled by system controller 20 and outputs the selected signal to transmission path decode circuit 3. Transmission path decode circuit 3 receives the signal from tuner 2, decodes the signal into a stream of audio and video data by MPEG2, and an object of a data broadcast, and outputs them to TS separation/select circuit 4.

TS separation/select circuit 4 outputs the audio and video data to selector 5 and the object to system controller 20. Selector 5 outputs the audio and video data to AV decoder 6 and the AV decoder 6 MPEG system demultiplexer 156 separates the audio and video data for each coding unit into video data and audio data and outputs the video data to video processing circuit 7 and the audio data to audio processing circuit 11. Video processing circuit 7 reproduces and outputs the video data to mixer 8 and audio processing circuit 11 reproduces and outputs the audio data to audio output circuit 12.

Furthermore, system controller 20 temporarily stores to program memory 21 the object of the data broadcast received from TS separation/select circuit 4, and subsequently reads the object from program memory 21 and processes it. System controller 20 then outputs the processed object to data display circuit 22. Data display circuit 22 indicates to mixer 8 a location on a screen to display the object and also outputs to mixer 8 data employed to display the object on the screen.

Mixer 8 composites the video data received from video processing circuit 7 and the object received from data display circuit 22 and outputs the composite data to video output circuit 9. Video output circuit 9 receives the data from mixer 8 and outputs it to CRT 10 to display a screen compositing the video data and the object together. CRT 10 displays a screen of the video data with the object composited. Audio output circuit 12 outputs the audio data to speaker 13, which in turn outputs an audio signal externally. A user can thus enjoy a selected channel's broadcast program.

Audio and video data and an object of a data broadcast are stored to storage device 17 by an operation, as will now be described. Receiver 100 is powered on, a user selected channel is set in tuner 2, and tuner 2 selects a signal which is in turn input via transmission path decode circuit 3 to TS separation/select circuit 4, as has been described previously.

When TS separation/select circuit 4 receives audio and video data and an object of a data broadcast the circuit outputs the data and the object to system controller 20. In system controller 20 key generation means 201 generates and outputs an encryption and decryption key to encryption means 202 and recording means 203. Encryption mean 202 receives audio and video data from TS separation/select circuit 4, encrypts the data with a key (the encryption key) received from key generation means 201 and outputs the encrypted data to recording means 203.

Table creation means 204 receives the audio and video data and the object from TS separation/select circuit 4 and information of a size of an encrypted block from encryption means 202 and uses them to create a search table, as has been described above, and provides the search table and the object to recording means 203.

In response, recording means 203 stores the encrypted data received from encryption means 202 to storage device 17 via buffer memory 16, and correlates the search table and object and a key received from key generation means 201 (the decryption key) with the encrypted data and stores them to storage device 17.

Thus an operation performed when audio and video data is stored ends.

Figure 11:
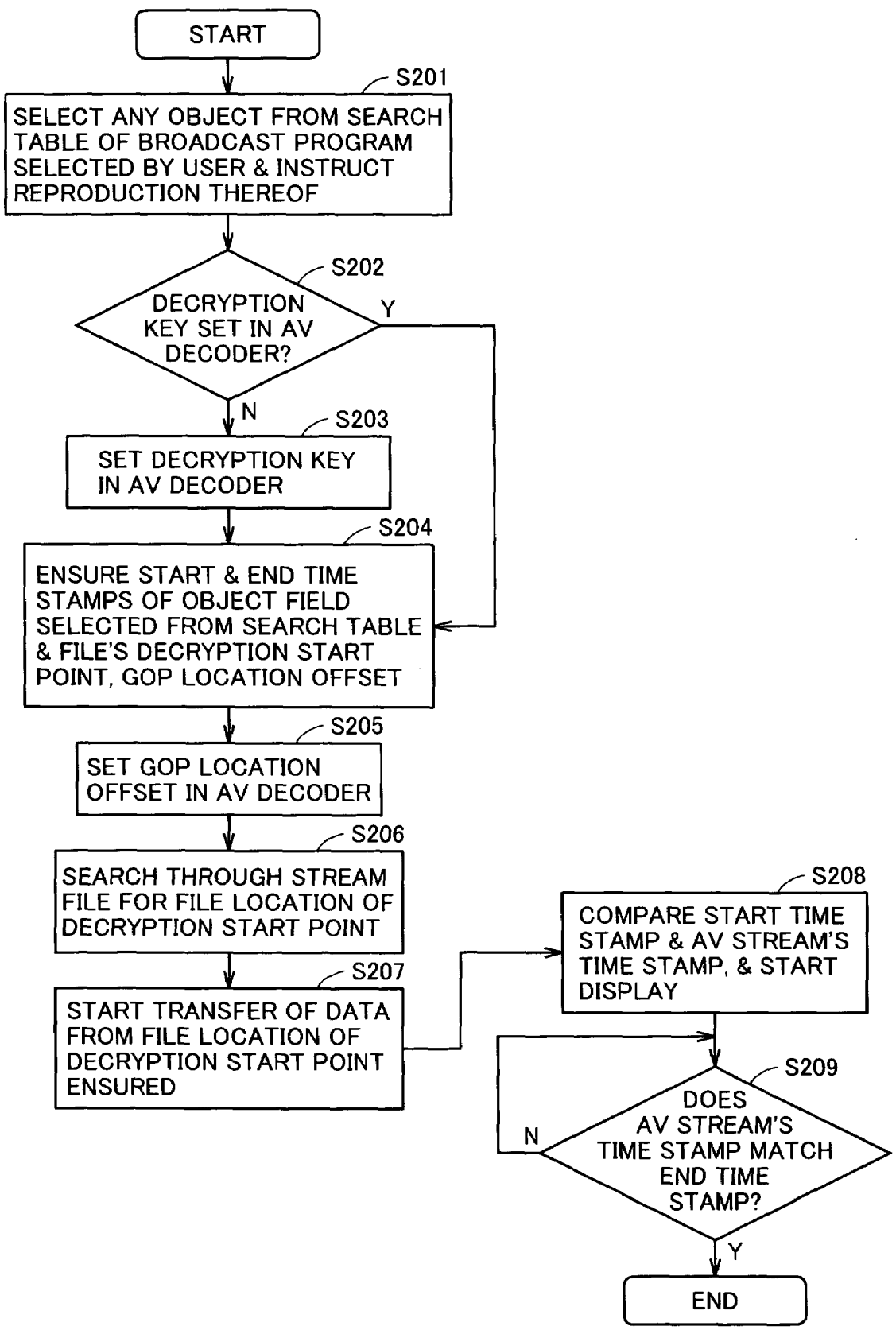
FIG. 11 is a flow chart for illustrating an operation performed to randomly reproduce encrypted data in accordance with the present invention.

With reference to FIGS. 1 and 11, a broadcast program is searched for as based on an object of a data broadcast and encrypted data stored in storage device 17 is randomly reproduced, as will be described hereinafter. When a reproduction operation starts, a user designates a broadcast program that the user desires to reproduce. From a search table for the designated program any object is selected and its reproduction is instructed (S201). More specifically, when the user designates a broadcast program that the user desires to reproduce, a search table for the designated program is read from storage device 17 and displayed on CRT 10. The user refers to the search table displayed on CRT 10, selects an object that the user desires to reproduce, and issues an instruction to reproduce the selected object.

System controller 20 determines if a decryption key is set in AV decoder 6 at decryption key setting register 152 (S202). If not then a decryption key is read from storage device 17 and set in AV decoder 6 at register 152 (S203). If at S202 system controller 20 determines that a decryption key has been set in AV decoder 6 at register 152 then the reproduction operation proceeds with S204.

If at S202 a decision is made that a decryption key is set in AV decoder 6, or after S203, the selected object's start and end time stamps, a file's decryption start point and a GOP location offset are ensured from search table 50 (S204). Then system controller 20 sets the ensured GOP location offset in AV decoder 6 at offset value setting register 154 (S205).

Subsequently system controller 20 detects from a stream file (encrypted data 40 in FIG. 6) a file location corresponding to the decryption start point ensured at S204 (S206) and controls storage device 17 to start transfer of encrypted data at the detected location. Storage device 17 outputs the encrypted data from the decryption start point via buffer memory 16 to selector 5 to start transfer of the encrypted data (S207).

Subsequently, selector 5 outputs the encrypted data to AV decoder 6. In AV decoder 6 decryption circuit 151 operates under control from AV decoder control register 153 to decrypt encrypted data with a decryption key set by decryption key setting register 152 and outputs audio and video data to offset cutting filter 155. Filter 155 operates under control from register 153 deletes from the audio and video data received from decryption circuit 151 the audio and video data corresponding to the GOP location offset (=a byte) set by register 154, and outputs resultant data to MPEG system demultiplexer 156.

MPEG system demultiplexer 156 separates the audio and video data for each coding unit into video data and audio data and outputs the video data to video processing circuit 7 and the audio data to audio processing circuit 11.

Then system controller 20 compares a start time stamp read from search table 50 with a time stamp of an AV stream and if they match it starts displaying audio and video data (S201). When the AV stream's time stamp matches an end time stamp read from the search table (S209) the reproduction operation ends.

Thus, encrypted data stored in storage device 17 is read randomly at a location designated by an object of a data broadcast, and is decrypted and reproduced.

Figure 12:
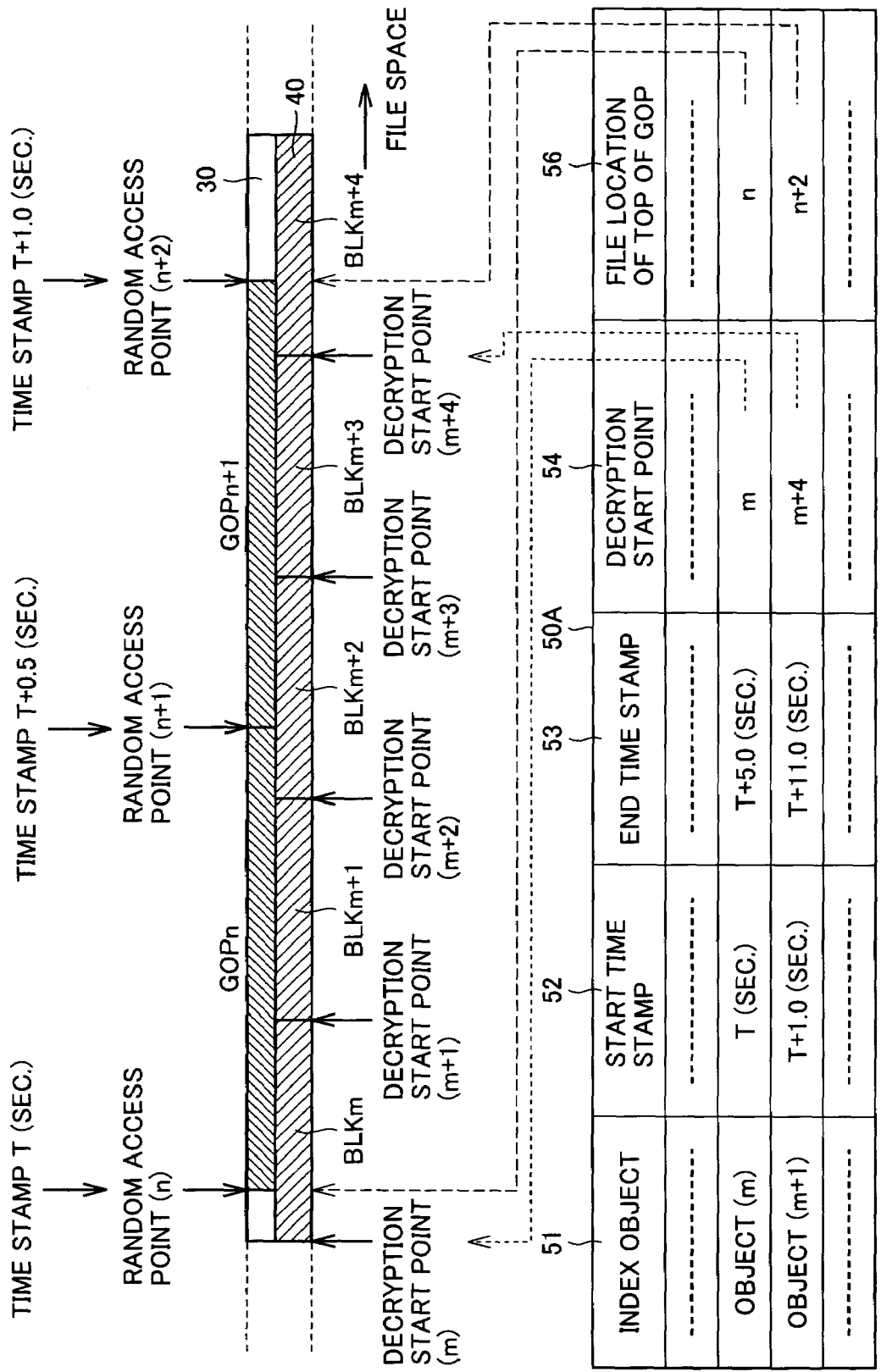
FIG. 12 illustrates another method of creating the search table.

In the present invention a time search table may be a search table 50A shown in FIG. 12. Search table 50A corresponds to search table 50 with GOP location offset 55 replaced with a file location 56 of the top of a GOP. As such, search table 50A includes decryption start point m and file location n of the top of a GOP corresponding to time stamp T in seconds, and decryption start point m+4 and location n+2 of the top of a GOP corresponding to time stamp T+1.0 in seconds.

When search table 50A is used to start reproduction at audio and video data designated by object (m), system controller 20 reads from search table 50A decryption start point m and file location n corresponding to object (m) and sets them in AV decoder 6 at offset value setting register 154. Register 154 uses point m and location n to calculate the amount of data from point m to location n and sets the calculated amount of data in offset cutting filter 155. In other words, register 154 uses point m and location n to calculate GOP location offset 55 of search table 50 (see FIG. 6) and sets it in filter 55.

As such, when search table 50A is used, as well as when search table 50 is used, encrypted data stored in storage device 17 is read randomly at a location designated by an object of a data broadcast and the data is decrypted and reproduced.

While in the above description audio and video data is encrypted in a DTS encryption system, in the present invention audio and video data may be encrypted by different encryption systems.

In the first embodiment when the receiver stores digitally broadcast audio and video data to the storage device the receiver encrypts the audio and video data with an encryption key to generate encrypted data formed of a plurality of blocks and generates a search table correlating with an object of a data broadcast an amount offset between a decryption start location starting decrypting a block including audio and video data synchronized with the object and a random access location corresponding to the location of the top of a coding unit of audio and video data synchronized with the object and the decryption start location. The receiver then correlates the encrypted data and the search table with each other and thus stores them to the storage device. If a location to start to reproduce audio and video data is designated randomly by an object of a data broadcast, the search table can be used to start reproduction of audio and video data at the top of a coding unit corresponding to the designated object.

Second Embodiment

Figure 13:
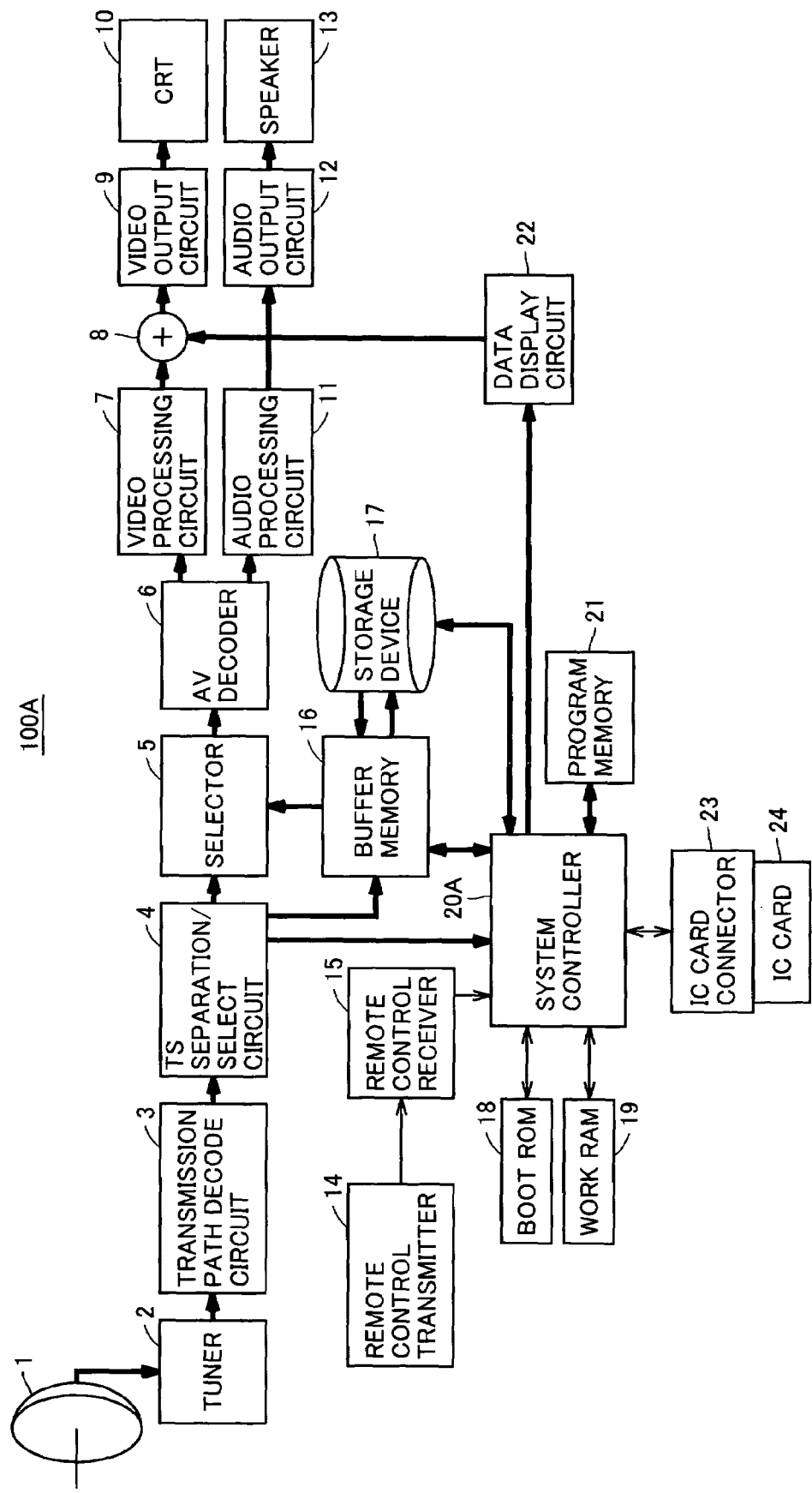
FIG. 13 is a schematic block diagram of the receiver in a second embodiment.

With reference to FIG. 13, a second embodiment provides a receiver 100A, which corresponds to receiver 100 with system controller 20 replaced with a system controller 20A. Note that in receiver 100A TS separation/select circuit 4 has the function described in conjunction with receiver 100 and in addition thereto a function storing data received from transmission path decode circuit 3 to storage device 17 via buffer member 16.

Receiver 100A receives encrypted data corresponding to an encryption of audio and video data as a digital broadcast, a decryption key used to decrypt encrypted data, and an object of a data broadcast. Then when encrypted data is to be stored to storage device 17, TS separation/select circuit 4 stores the encrypted data, the decryption key and the object to storage device 17 via buffer memory 16 and also outputs the encrypted data, the decryption key and the object to system controller 20A.

System controller 20A decrypts the encrypted data with the decryption key and creates search table 50 (or 50A) from the decrypted audio and video data, the object received from TS separation/select circuit 4 and an encrypted block's size information. Then system controller 20A correlates search table 50 (or 50A) with encrypted data stored in storage device 17 and thus stores the same to storage device 17.

Figure 14:
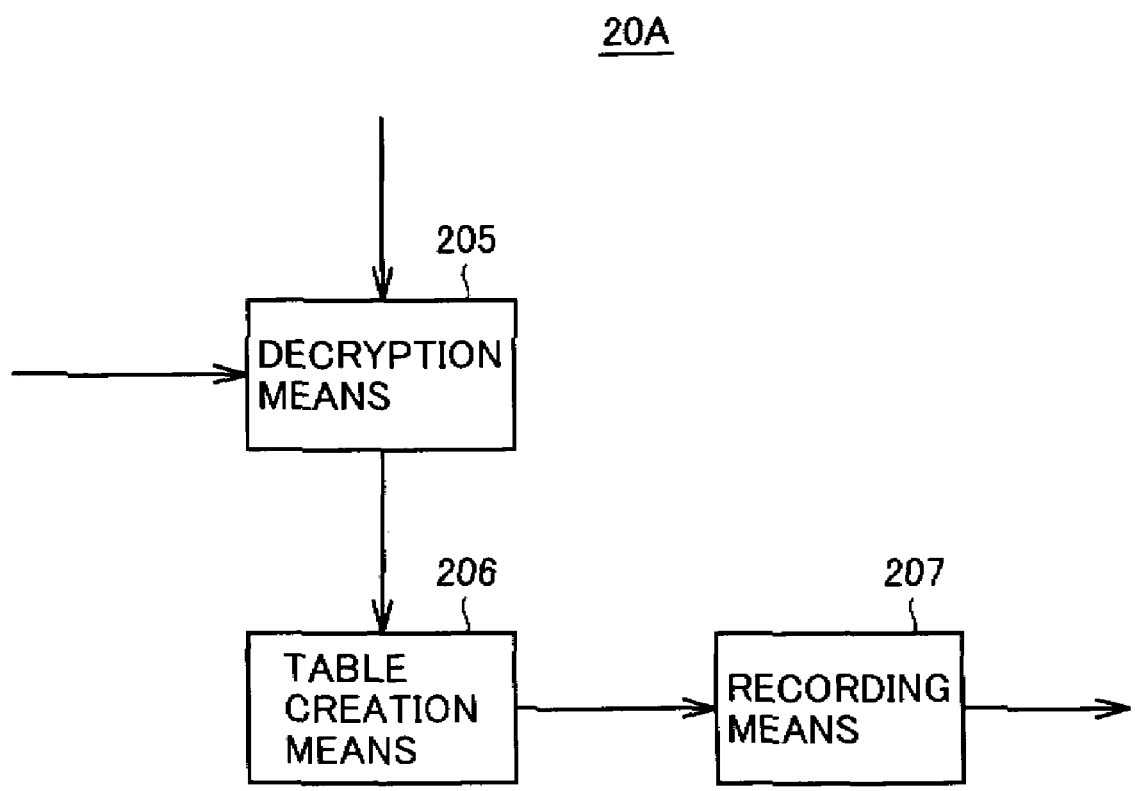
FIG. 14 is a functional block diagram of a system controller shown in FIG. 13.

FIG. 14 shows a functional block involved in the creation of the search table by system controller 20A. With reference to FIG. 14, system controller 20A includes decryption means 205, table creation means 206, and recording means 207.

Decryption means 205 decrypts encrypted data with a decryption key and provides the decrypted audio and video data to table creation means 206. Table creation means 206 uses an object of a data broadcast and the audio and video data received from decryption means 205 to create search table 50 (or 50A), as has been described in the first embodiment, and outputs search table 50 (or 50A) to recording means 207. In doing so, an encrypted block has a size determined by a broadcast system to have a fixed length and receiver 100A recognizes the block's size.

Recording means 207 receives search table 50 (or 50A) from table creation means 206 and stores it to storage device 17.

Again with reference to FIG. 13 encrypted audio and video data is not stored to storage device 17 and instead reproduced as will be described hereinafter. When receiver 100A is powered on, system controller 20A reads data from boot ROM 18 for initialization and develops it in work RAM 19 to initialize each component of receiver 100A. Then when receiver 100A attains a state capable of reception a user inputs to a remote control transmitter 14 a channel of a broadcast program that the user desires to watch.

Remote control transmitter 14 transmits the input channel to remote control receiver 15. Remote control receiver 15 receives the user selected channel and outputs it to system controller 20A. System controller 20A controls tuner 2 to select the channel received from remote control receiver 15.

Antenna 1 receives a digitally modulated and encrypted signal and outputs it to tuner 2. Tuner 2 selects a signal received from antenna 1 that is a signal of the channel selected as controlled by system controller 20A and outputs the selected signal to transmission path decode circuit 3. Transmission path decode circuit 3 receives the signal from tuner 2 and decrypts the signal, and outputs to TS separation/select circuit 4 a stream of encrypted audio and video data (encrypted data), a decryption key used to decrypt encrypted data, and an object of a data broadcast.

TS separation/select circuit 4 outputs the encrypted data and the decryption key to selector 5 and the object to system controller 20A. Selector 5 outputs the encrypted data and the decryption key to AV decoder 6. In AV decoder 6 decryption key setting register 152 receives the decryption key from selector 5 and sets it in decryption circuit 151 and decryption circuit 151 receives encrypted data from selector 5 and decrypts the data with the decryption key, and outputs audio and video data to offset cutting filter 155.

Reproducing a received digital broadcast without storing it only requires decrypting all encrypted data to reproduce audio and video data. Accordingly, filter 115 is not required to cut a portion of audio and video data and outputs audio and video data received from decryption circuit 151 exactly to MPEG system demultiplexer 156. The subsequent operation is performed as has been described in the first embodiment.

Encrypted audio and video data is stored to storage device 17, as will be described hereinafter. Receiver 100A is powered on, a user selected channel is set in tuner 2, and tuner 2 selects a signal which is in turn input via transmission path decode circuit 3 to TS separation/select circuit 4, as has been described previously.

When TS separation/select circuit 4 receives and stores encrypted audio and video data (encrypted data), a decryption key and an object of a data broadcast the circuit stores the encrypted data, the key and the object to storage device 17 via buffer memory 16 and also outputs them to system controller 20A. In system controller 20A decryption means 205 receives the encrypted data and the decryption key and decrypts the data with the key. Decryption means 205 outputs the decrypted audio and video data to table creation means 206.

Table creation means 206 uses a size of an encrypted block defined by a broadcast system and an object of a data broadcast, and the audio and video data received from decryption means 205 to create search table 50 (or 50A) by an operation identical to table creation means 204 described in the first embodiment, and outputs to recording means 207 search table 50 (or 50A) thus created and a decryption key sent by the data broadcast. Recording means 207 correlates search table 50 (or 50A) and the decryption key with the encrypted data and object stored in storage device 17 and thus stores the same to storage device 17.

Thus an operation performed when encrypted audio and video data is stored ends.

Encrypted data stored in storage device 17 is randomly reproduced as has been described in the first embodiment.

In the second embodiment, encrypted audio and video data received and stored to a storage device can be reproduced at audio and video data of a coding unit synchronized with an object of a data broadcast designated by a user.

Third Embodiment

Figure 15:
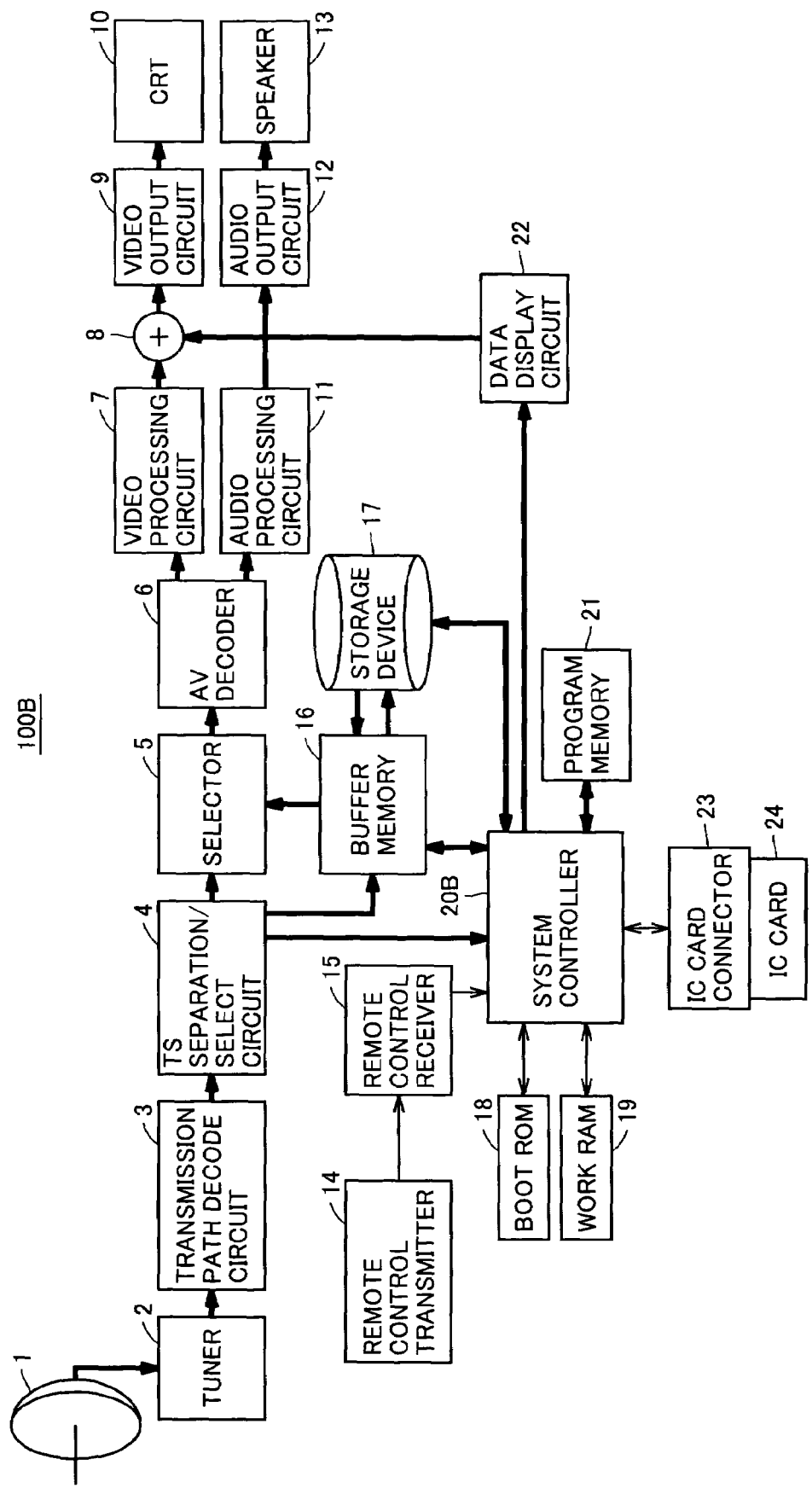
FIG. 15 is a schematic block diagram of the receiver in a third embodiment.
Figure 16:
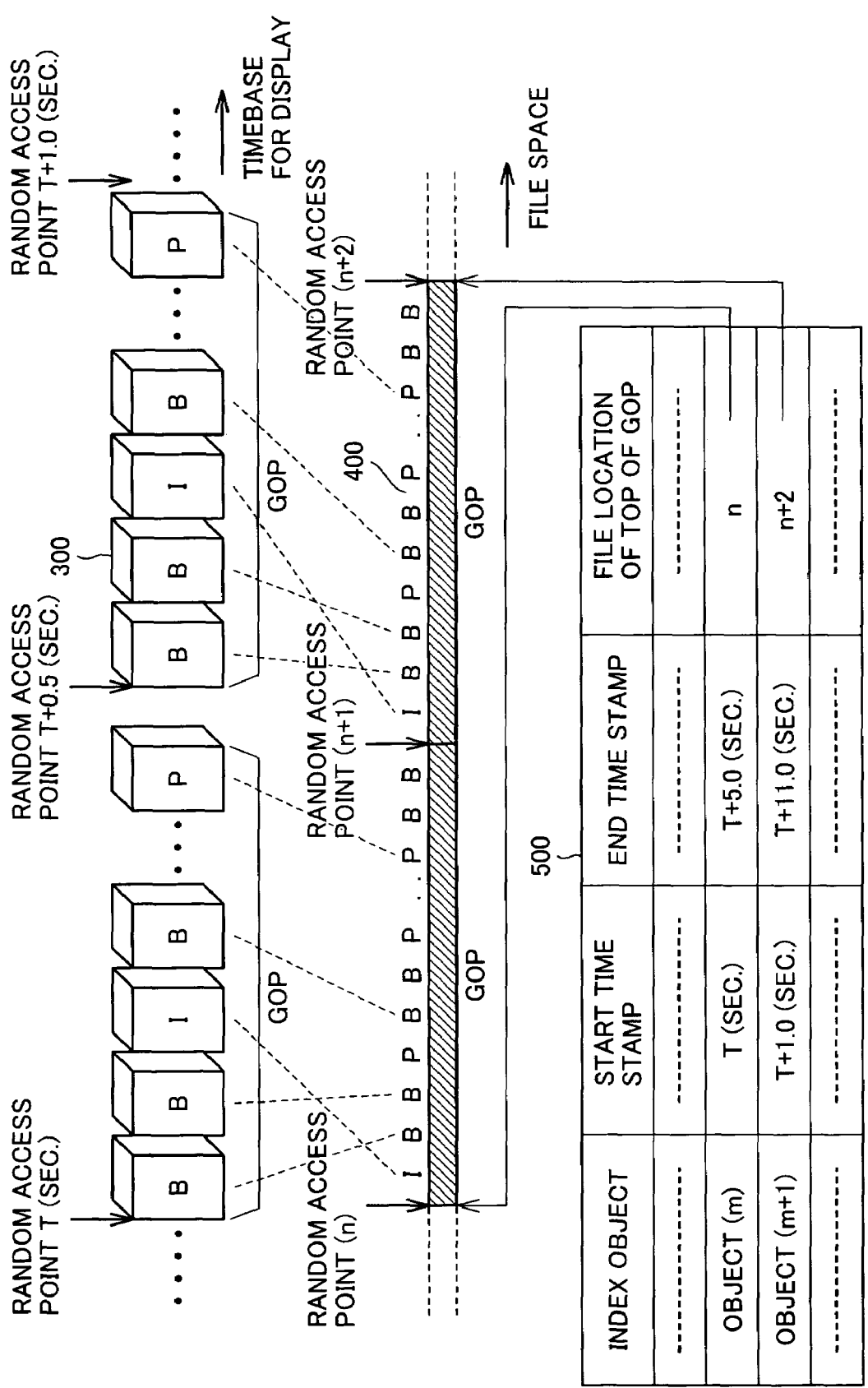
FIG. 16 illustrates a method of creating a search table, as conventional.
Figure 17:
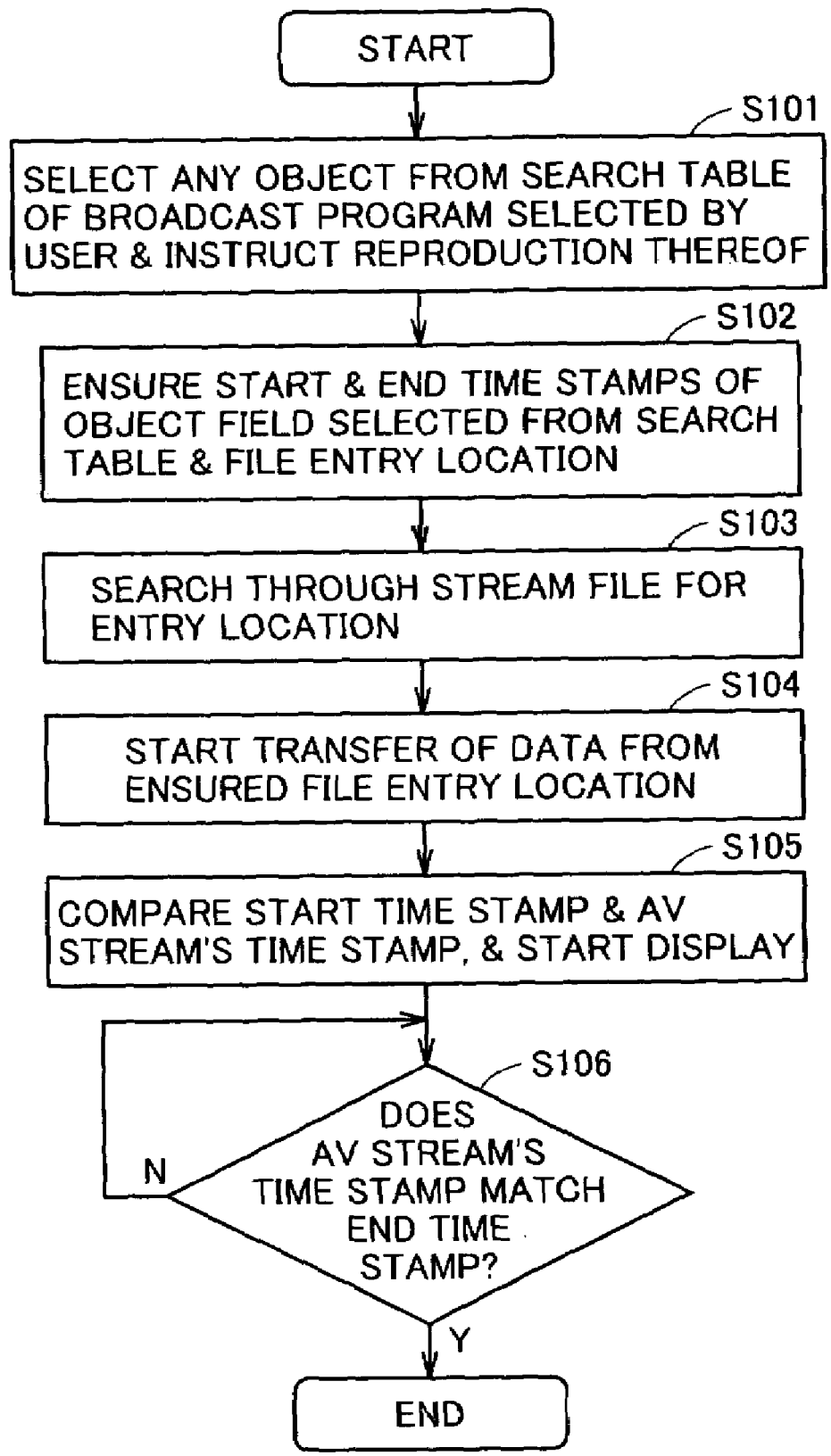
FIG. 17 is a flow chart for illustrating an operation performed to randomly reproduce unencrypted audio and video data in accordance with a data broadcast.

With reference to FIG. 15, a third embodiment provides a receiver 100B, which corresponds to receiver 100 with system controller 20 replaced with a system controller 20B. Note that in receiver 100B TS separation/select circuit 4 has the function described in conjunction with receiver 100 and in addition thereto a function storing data received from transmission path decode circuit 3 to storage device 17 via buffer member 16.

Receiver 100B receives audio and video data encrypted or encrypted data, a decryption key used to decrypt encrypted data, search table 50 (or 50A) created by receiver 100, 100A in the first and second embodiments, and an object of a data broadcast, and stores the data, the key, the table and the object to storage device 17 via buffer memory 16.

The operation performed to reproduce audio and video data encrypted or encrypted data, rather than store the data, is performed as has been described in the second embodiment.

Encrypted data is stored to storage device 17, as will now be described. Receiver 100B is powered on and TS separation/select circuit 4 receives encrypted data, a decryption key, and an object of a data broadcast, as has been described previously in the second embodiment.

TS separation/select circuit 4 stores the received encrypted data, the decryption key and the object to storage device 17 via buffer memory 16. Thus an operation to store encrypted data ends.

Encrypted data stored in storage device 17 is randomly reproduced as has been described in the first embodiment.

In the third embodiment, audio and video data encrypted or encrypted data, a decryption key used to decrypt encrypted data, and a search table used to randomly reproduce encrypted data for starting reproduction of audio and video data at the top of a coding unit of audio and video data synchronized with an object of a data broadcast, are digitally broadcast. The receiver is not required to create a search table to randomly reproduce encrypted data at a location designated by an object of a data broadcast.

Note that in the present invention, a data broadcast broadcasts an object defined as "data having a time stamp for displaying in synchronization with video."

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is applicable to recording media encrypting and recording audio and video data digitally broadcast, reproduction apparatuses reproducing audio and video data from the recording media, and recording and reproduction apparatuses receiving audio and video data or encrypted audio and video data and recording the data on recording media and reproducing the data from the media.

The invention claimed is:

1. Randomly accessible recording medium recording audio and video data configuring a broadcast program and encoded into units as prescribed, comprising:
    encrypted formed of a plurality of blocks of said audio and video data encoded encrypted;
    a plurality of objects associated with said program and broadcast as a data broadcasting service;
    a plurality of decryption start location information provided to correspond to said plurality of objects and indicating a decryption start location starting decrypting encrypted data included in a block formed by encrypting audio and video data broadcast in synchronization with each object; and
    a plurality of offset information provided to correspond to said plurality of decryption start location information and indicating an amount offset between said decryption start location for encrypted data included in a single block and a random access location of said unit including audio and video data identical to a portion of audio and video data obtained by decrypting encrypted data included in said single block, wherein said random access location is located between said decryption start location for said single block and a decryption end location ending decrypting said encrypted data.

2. The medium of claim 1, further comprising a decryption key used to decrypt said encrypted data.

3. The medium of claim 1, further comprising a plurality of time stamps provided to correspond to said plurality of objects and indicating a timing of outputting to an external output device audio and video data located at a top of said unit synchronized with said each object's start timing.

4. A recording and reproduction apparatus receiving and recording to and reproducing from a recording medium audio and video data configuring a broadcast program and encoded into units as prescribed and an object broadcast as a data broadcasting service associated with said program, comprising:
    means said audio and video data and said object;
    encryption means encrypting said received audio and video data in a prescribed system to generate encrypted data formed of a plurality of blocks;
    recording means recording to said recording medium said encrypted data, a search table used to search as based on said object for audio and video data broadcast in synchronization with said object, and a decryption key used to decrypt said encrypted data; and
    means receiving an instruction issued to reproduce said audio and video data to decrypt said encrypted data with said decryption key in accordance with said search table, separate resultant, decrypted audio and video data for each said unit into audio data and video data for reproduction, wherein
    said search table is formed of a plurality of said objects, a plurality of decryption start location information provided to correspond to said plurality of objects, and a plurality of offset information provided to correspond to said plurality of decryption start location information,
    said decryption start location information indicates a decryption start location starting decrypting encrypted data included in a single block formed by encrypting audio and video data broadcast in synchronization with each object, said offset information indicates an amount offset between a decryption start location for encrypted data included in said single block and a random access location of said unit including audio and video data identical to a portion of audio and video data decrypted from encrypted data included in said single block, said random access location is located between said decryption start location for said single block and a decryption end location ending decrypting said encrypted data, and said reproduction means deletes from said decrypted audio and video data audio and video data corresponding to an amount offset designated by said offset information, for reproduction for each said unit.

5. The apparatus of claim 4, further comprising means creating said search table from said received audio and video data and object, and said encrypted data.

6. The apparatus of claim 4, further comprising key generation means generating an encryption key used to encrypt said audio and video data, and said decryption key.

7. The apparatus of claim 6, further comprising means creating said search table from said received audio and video data and object and said encrypted data.

8. The apparatus of claim 4, wherein said reproduction means includes:
   a decryption circuit decrypting said encrypted data with said decryption key;
   a filter deleting from audio and video data decrypted by said decryption circuit audio and video data corresponding to an amount offset designated by said offset information;
   a demultiplexer receiving audio and video data from said filter to separate the audio and video data into said video data and said audio data;
   a video processing circuit processing said video data for external output; and
   an audio processing circuit processing said audio data for external output.

9. A recording and reproduction apparatus receiving and recording to and reproducing from a recording medium encrypted data formed of a plurality of blocks corresponding to an encryption in a prescribed system of audio and video data configuring a broadcast program and encoded into units as prescribed and an object associated with said program and broadcast as a data broadcasting service, the apparatus comprising:
   means receiving said encrypted data, a decryption key used to decrypt said encrypted data, and said object;
   recording means recording to said recording medium said encrypted data, a search table used to search as based on said object for audio and video data broadcast in synchronization with said object, and said decryption key; and
   means receiving an instruction issued to reproduce said audio and video data to decrypt said encrypted data with said decryption key in accordance with said search table, separate resultant, decrypted audio and video data for each said unit into audio data and video data for reproduction, wherein
   said search table is formed of a plurality of said objects, a plurality of decryption start location information provided to correspond to said plurality of objects, and a plurality of offset information provided to correspond to said plurality of decryption start location information,
   said decryption start location information indicates a decryption start location starting decrypting encrypted data included in a single block formed by encrypting audio and video data broadcast in synchronization with each object,
   said offset information indicates an amount offset between a decryption start location for encrypted data included in said single block and a random access location of said unit including audio and video data identical to a portion of audio and video data decrypted from encrypted data included in said single block,
   said random access location is located between said decryption start location for said single block and a decryption end location ending decrypting said encrypted data, and
   said reproduction means deletes from said decrypted audio and video data audio and video data corresponding to an amount offset designated by said offset information, for reproduction for each said unit.

10. The apparatus of claim 9, further comprising means decrypting said encrypted data with said decryption key and using resultant, decrypted audio and video data and said object to create said search table.

11. The apparatus of claim 9, wherein said reproduction means includes:
   a decryption circuit decrypting said encrypted data with said decryption key;
   a filter deleting from audio and video data decrypted by said decryption circuit audio and video data corresponding to an amount offset designated by said offset information;
   a demultiplexer receiving audio and video data from said filter to separate the audio and video data into said video data and said audio data;
   a video processing circuit processing said video data for external output; and
   an audio processing circuit processing said audio data for external output.

12. A recording and reproduction apparatus receiving and recording to and reproducing from a recording medium encrypted data formed of a plurality of blocks corresponding to an encryption in a prescribed system of audio and video data configuring a broadcast program and encoded into units as prescribed and an object associated with said program and broadcast as a data broadcasting service, the apparatus comprising:
   means receiving said encrypted data, a decryption key used to decrypt said encrypted data, said object, and a search table used to search as based on said object for audio and video data broadcast in synchronization with said object;
   means recording said encrypted data, said search table and said decryption key to said recording medium; and
   means receiving an instruction issued to reproduce said audio and video data to decrypt said encrypted data with said decryption key in accordance with said search table, separate resultant, decrypted audio and video data for each said unit into audio data and video data for reproduction, wherein
   said search table is formed of a plurality of said objects, a plurality of decryption start location information provided to correspond to said plurality of objects, and a plurality of offset information provided to correspond to said plurality of decryption start location information,
   said decryption start location information indicates a decryption start location starting decrypting encrypted data included in a single block formed by encrypting audio and video data broadcast in synchronization with each object, said offset information indicates an amount offset between a decryption start location for encrypted data included in said single block and a random access location of said unit including audio and video data identical to a portion of audio and video data decrypted from encrypted data included in said single block, said random access location is located between said decryption start location for said single block and a decryption end location ending decrypting said encrypted data, and said reproduction means deletes from said decrypted audio and video data audio and video data corresponding to an amount offset designated by said offset information, for reproduction for each said unit.

13. The apparatus of claim 12, wherein said reproduction means includes:

a decryption circuit decrypting said encrypted data with said decryption key;

a filter deleting from audio and video data decrypted by said decryption circuit audio and video data corresponding to an amount offset designated by said offset information;

a demultiplexer receiving audio and video data from said filter to separate the audio and video data into said video data and said audio data;

a video processing circuit processing said video data for external output; and an audio processing circuit processing said audio data for external output.

14. A reproduction apparatus decrypting and reproducing encrypted data recorded on a recording medium, said encrypted data being formed of a plurality of blocks corresponding to an encryption in a prescribed system of audio and video data configuring a broadcast program and encoded into units as prescribed, said recording medium including said encrypted data, a decryption key used to decrypt said encrypted data and a search table used to search as based on an object associated with said program and transmitted as a data broadcasting service for audio and video data broadcast in synchronization with said object, said search table being formed of a plurality of said objects, a plurality of decryption start location information provided to correspond to said plurality of objects and a plurality of offset information provided to correspond to said plurality of decryption start location information, said decryption start location information being indicative of a decryption start location starting decrypting encrypted data included in a single block formed by encrypting audio and video data broadcast in synchronization with each object, said offset information being indicative of an amount offset between a decryption start location for encrypted data included in said single block and a random access location of said unit including audio and video data identical to a portion of audio and video data decrypted from encrypted data included in said single block, said random access location being located between said decryption start location for said single block and a decryption end location ending decrypting said encrypted data, the reproduction apparatus comprising:

a decryption circuit decrypting said encrypted data with said decryption key;

a filter deleting from audio and video data decrypted by said decryption circuit audio and video data corresponding to an amount offset designated by said offset information;

a demultiplexer receiving audio and video data from said filter to separate the audio and video data into said video data and said audio data;

a video processing circuit processing said video data for external output; and an audio processing circuit processing said audio data for external output.

* * * * *